United States Patent [19]

Gibb et al.

[11] Patent Number: 4,662,785
[45] Date of Patent: May 5, 1987

[54] APPARATUS AND METHOD FOR CONNECTING SUBSEA PRODUCTION EQUIPMENT TO A FLOATING FACILITY

[75] Inventors: Peter R. Gibb, Port Coquitlam; Karel Balik, North Vancover, both of Canada

[73] Assignee: Novacorp International Consulting Ltd., Alberta, Canada

[21] Appl. No.: 578,204

[22] Filed: Feb. 7, 1984

[30] Foreign Application Priority Data

Feb. 18, 1983 [CA] Canada .................................. 421909

[51] Int. Cl.⁴ .......................... E21B 7/12; F16L 37/08
[52] U.S. Cl. .................................... 405/195; 166/341; 166/359; 285/315
[58] Field of Search ...................... 405/169, 195, 224; 166/350, 359, 367, 338, 341, 343, 344; 285/315, 316, 319, 320

[56] References Cited

U.S. PATENT DOCUMENTS

| | | | |
|---|---|---|---|
| 3,339,944 | 9/1967 | Poague | 285/315 X |
| 3,339,947 | 9/1967 | Maisey | 285/315 |
| 4,040,264 | 8/1977 | Neilon | 405/195 |
| 4,188,156 | 2/1980 | Fisher | 405/195 |
| 4,214,842 | 7/1980 | Franks | 405/195 X |
| 4,411,317 | 10/1983 | Gieswein | 405/169 X |

FOREIGN PATENT DOCUMENTS 2037347 7/1980 United Kingdom .
2097042 10/1982 United Kingdom .
2135748 9/1984 United Kingdom .

Primary Examiner—David H. Corbin
Attorney, Agent, or Firm—Burns, Doane, Swecker & Mathis

[57] ABSTRACT

There is disclosed a type of riser to connect subsea hydrocarbon production equipment to a floating storage, process or control facility which combines the advantages of integral and non-integral risers previously used. This is achieved by a locking mechanism which allows the individual tubes to be freed once each section of riser is added, and a subsea remotely operated connector that allows individual tubing to be released. Improvements in the design of collet connectors are also disclosed. There is also disclosed a guidelineless method of connecting risers or other equipment to subsea installations. The method uses a cone on the subsea equipment and a guideframe on the riser. The guideframe aligns itself with the subsea cone prior to the riser being connected. As the riser is drawn to the subsea mandrel the guideframe aligns the riser connector with the mandrel. A still further embodiment disclosed herein is a flexjoint consisting of a series of flexjoints in an outer case with a high pressure tube inside. Internal tubes are fixed at either end of the assembly to the outer case.

10 Claims, 34 Drawing Figures

APPARATUS AND METHOD FOR CONNECTING SUBSEA PRODUCTION EQUIPMENT TO A FLOATING FACILITY

FIELD OF THE INVENTION

This invention relates to apparatus and methods of connecting subsea equipment to a floating facility and in particular to the connection of subsea located hydrocarbon production equipment to a floating storage, process or control facility.

BACKGROUND OF THE INVENTION

Conventionally, subsea hydrocarbon production equipment is connected to floating storage and process or control facilities by a pipe or set of pipes called risers. Risers have taken many forms since they were first used. This invention relates to multiple pipe risers where a central pipe is surrounded by other smaller pipes or tubes. This type of riser can be in two forms, which are commonly referred to in the industry as Integral or Non-integral.

When risers are run from a surface rig they are typically made up of lengths of pipe about 50 ft. long. These lengths of pipe, referred to as joints, are joined together and lowered to the sea bed. It is the method of connecting the riser joints together and running them to the sea floor that introduces the label of Integral or Non-integral.

An integral riser is where a riser joint, i.e. a length of riser, is made with the central pipe and the surrounding pipes or tubes permanently joined together. When one joint of riser is attached to another joint of riser all the individual pipes are stabbed and joined together at the same time. This has the advantage of speed in joining and running the riser. It also means that when the riser is supported or tensioned at the surface only a single attachment is needed. There is also a serious disadvantage. Because the outer tubes are rigidly attached to the central pipe the complete riser acts as a one-piece structural member. When the riser bends, which is a normal operating state, the outer tubes take the highest load. In many cases it is not practical to make the outer tubes and their supports strong enough. Alternately, slip joints can be used but this introduces fretting and wear problems.

Non-integral risers are risers where the outer tubes are not rigidly attached to each other or the central pipe. The central pipe usually has guides at regular intervals along its length to hold the outer tubes in the correct lateral location. Typically the central pipe is run first by itself and locked onto the equipment subsea. The outer tubes are then run through the guides, one at a time, and locked to the equipment subsea. Each outer tube is tensioned separately from the surface and acts independently of the others. This arrangement also has the added benefit of being able to retrieve individual tubes if a fault develops without interfering with the rest of the riser.

DESCRIPTION OF THE INVENTION

It is the objective of the present invention to provide a riser system which will combine the advantages of Integral and Non-integrl risers. Apparatus and a method of attaching the outer tubes to the central pipe is proposed whereby the riser acts as an Integral riser until the riser joints are connected. After connection the riser acts as a Non-integral riser.

The invention is illustrated in the accompanying drawings in which.

Figure 1:
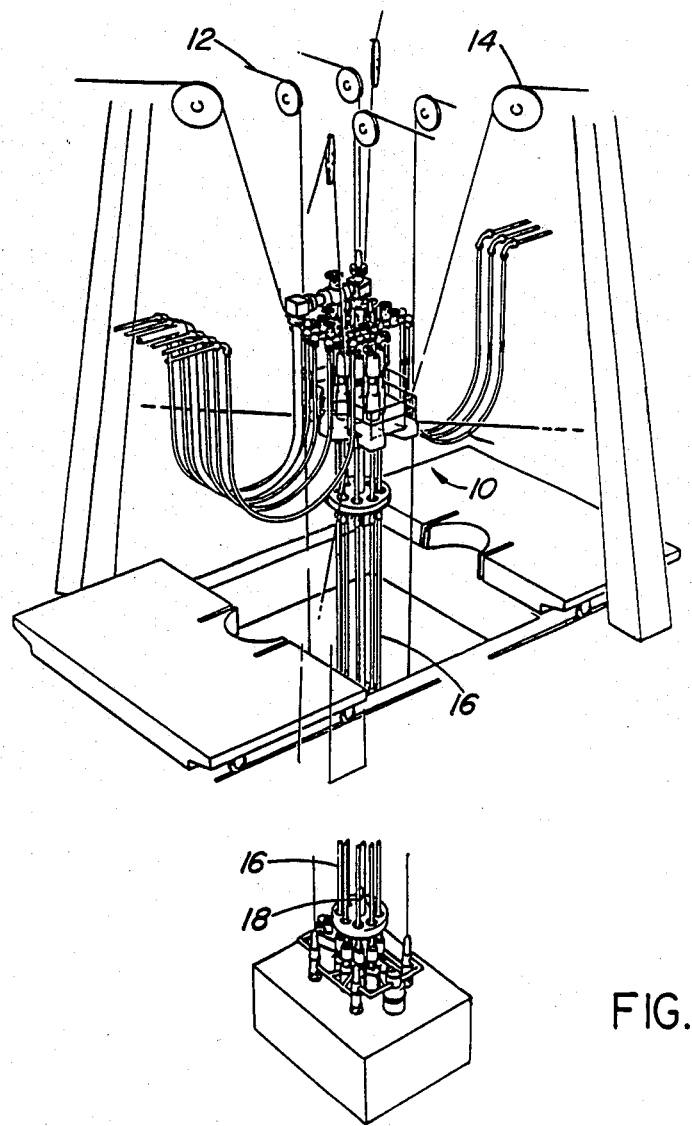
FIG. 1 is a perspective view of a multiple pipe riser.
Figure 2:
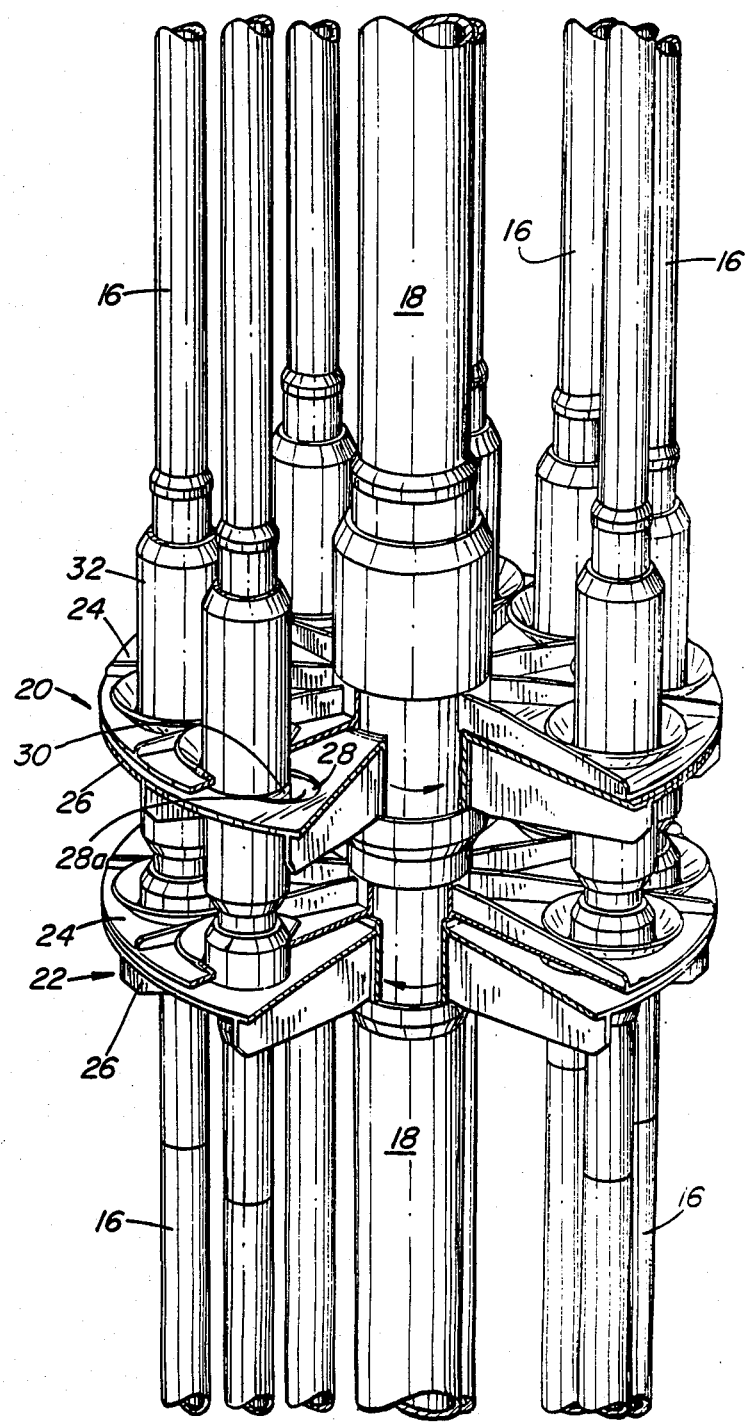
FIG. 2 is a perspective view of an integral riser with removable tubing.
Figure 4:
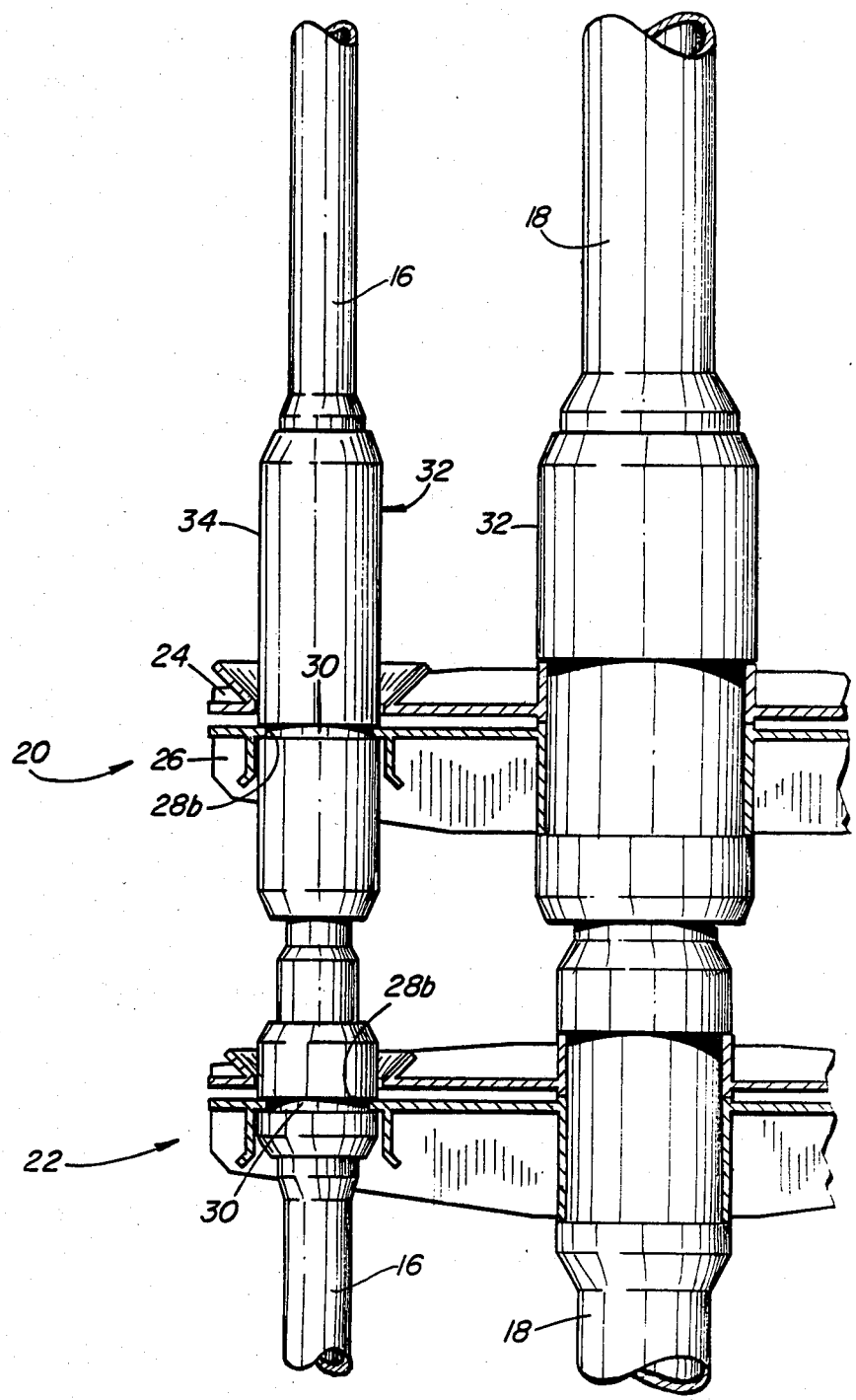
FIG. 4 is a view similar to FIG. 3 but showing the joint stabbed.
Figure 6:
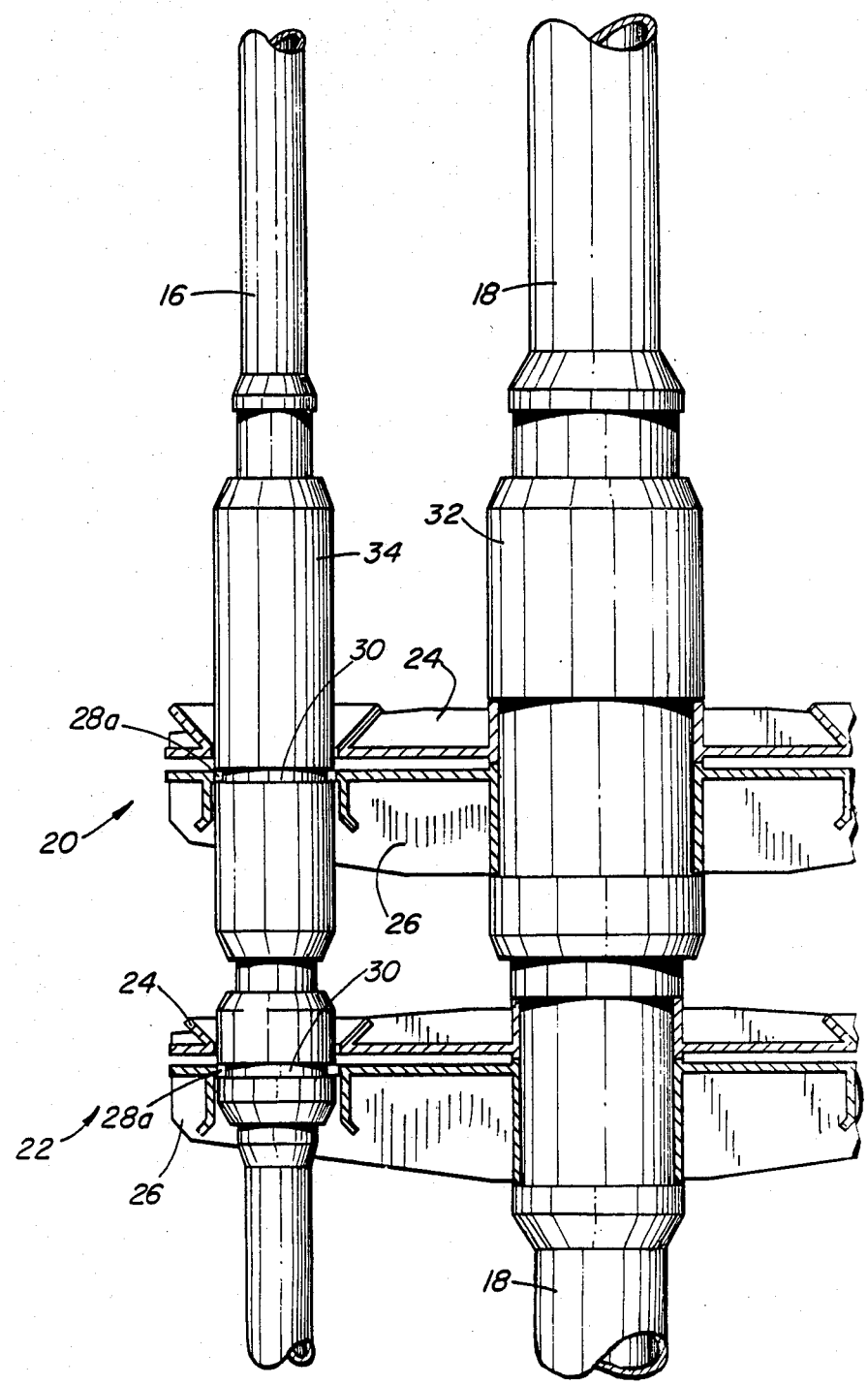
FIG. 6 is view similar to FIG. 5 and showing the unlocked position of the locking plates.
Figure 30:
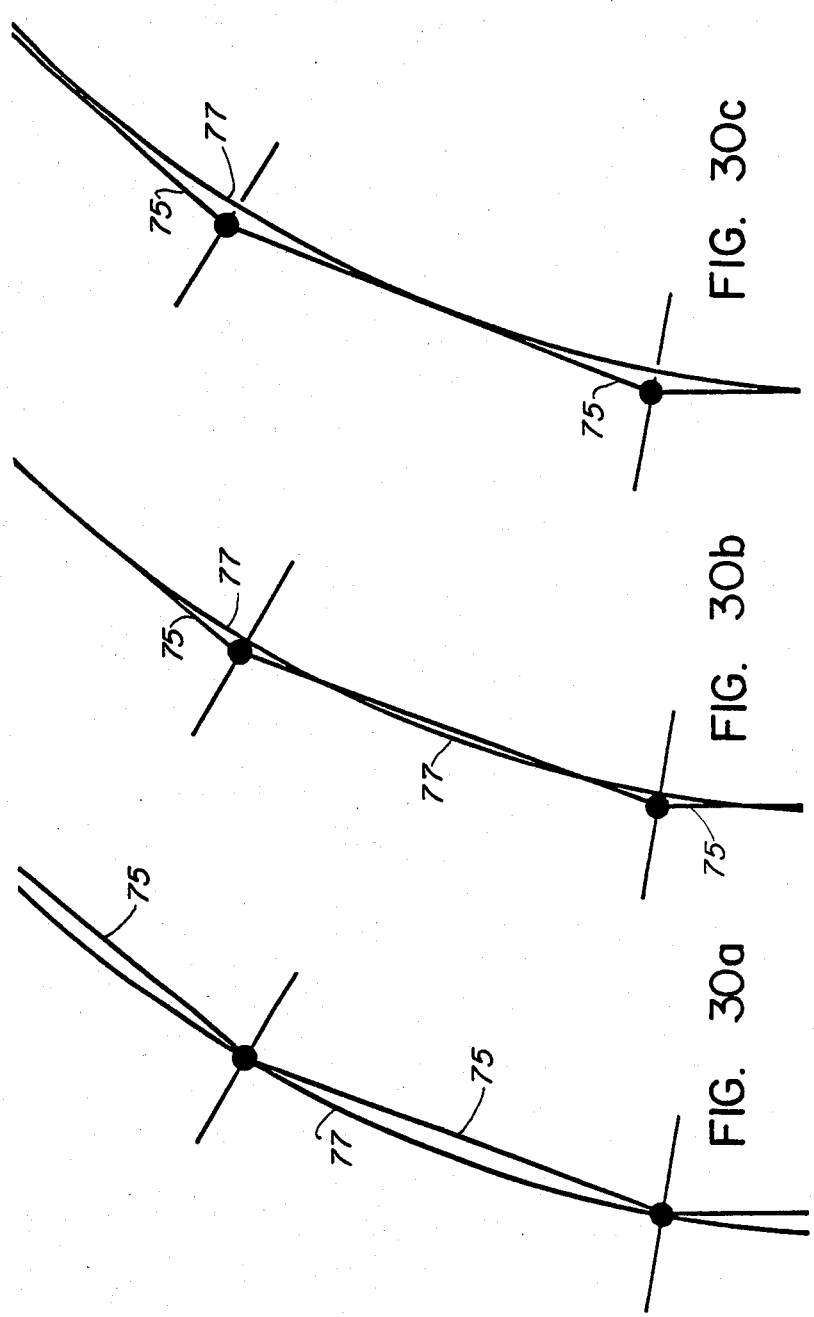

Referring to FIG. 1 there is shown a riser suspension platform 10 supported on a surface rig, not shown, by guideline and riser tensioners 12 and 14 respectively. As seen in FIG. 2, the outer pipes 16 are attached to the central pipe 18 by upper and lower connecting frames 20 and 22 at each end of the riser joint. Each frame 20, 22 consists of two plates, a guideplate 24 for locating all the tubes in the correct lateral location, and a lockplate 26 which holds the tubes in the correct vertical location. The lockplate 26 contains special holes 28 for the tubes. The holes 28 (FIG. 2) are elongated with one end 28a being large enough to allow the tube and connectors to pass through; the other end 28b is smaller and sized to suit a locking groove 30, FIG. 30, in the tube 16. The lockplate 26 can be moved relative to the guideplate 24. In one position of the lockplate (FIG. 6) the tube 16 is free to move vertically. When the lockplate 26 is moved so that the smaller end 28b of the elongated hole 28 engages with the locking groove 30 in the tube 16, the tube is restrained vertically, as seen in FIG. 4.

In the preferred embodiment each tube 16 is joined to the next tube below it with a connector 32 which is locked using a sliding outer sleeve 34. The sliding sleeves 34 of all the tube and pipe connectors are joined together by the connecting frames 20, 22 at that end of the riser joint described above. Thus when the connector 32 of the central pipe 18 is locked all the outer tube connectors are locked at the same time.

Figure 3:
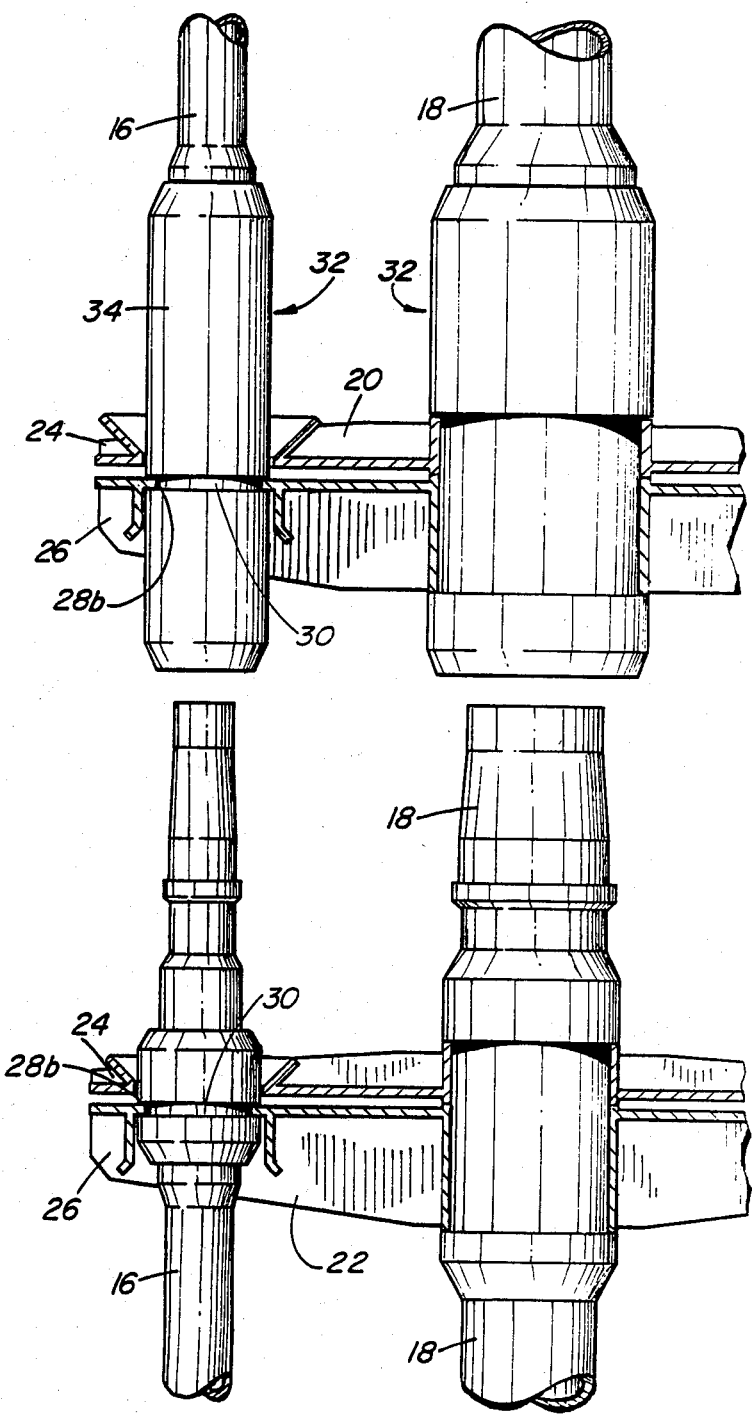
FIG. 3 is an elevation view, partly in section, showing a connection being made between two riser joints.
Figure 5:
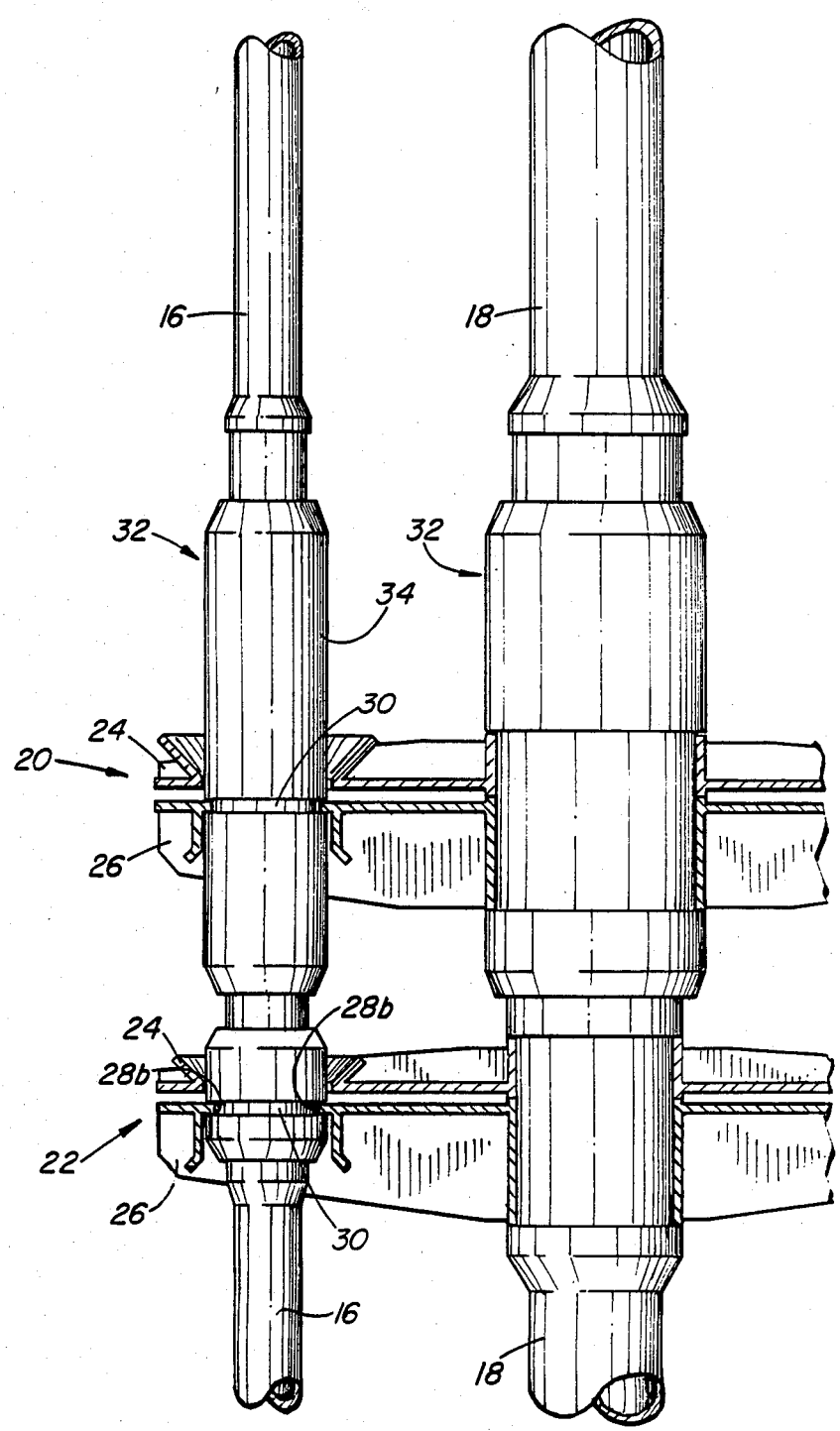
FIG. 5 is a view similar to FIG. 4 and showing the riser joints locked together.
Figure 7:
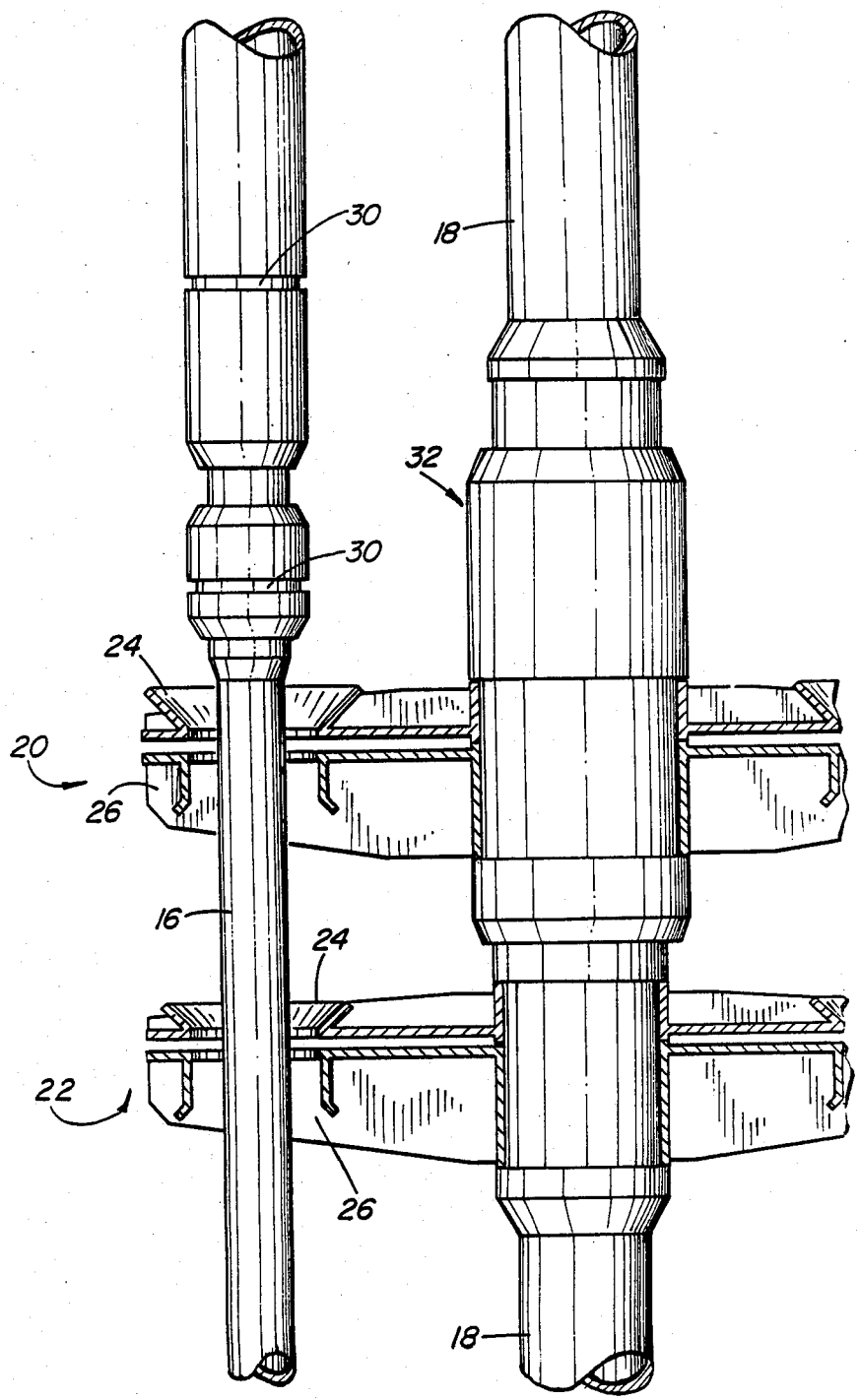
FIG. 7 is a view similar to FIG. 6 and showing an individual tube being freed for pulling.
Figure 8:
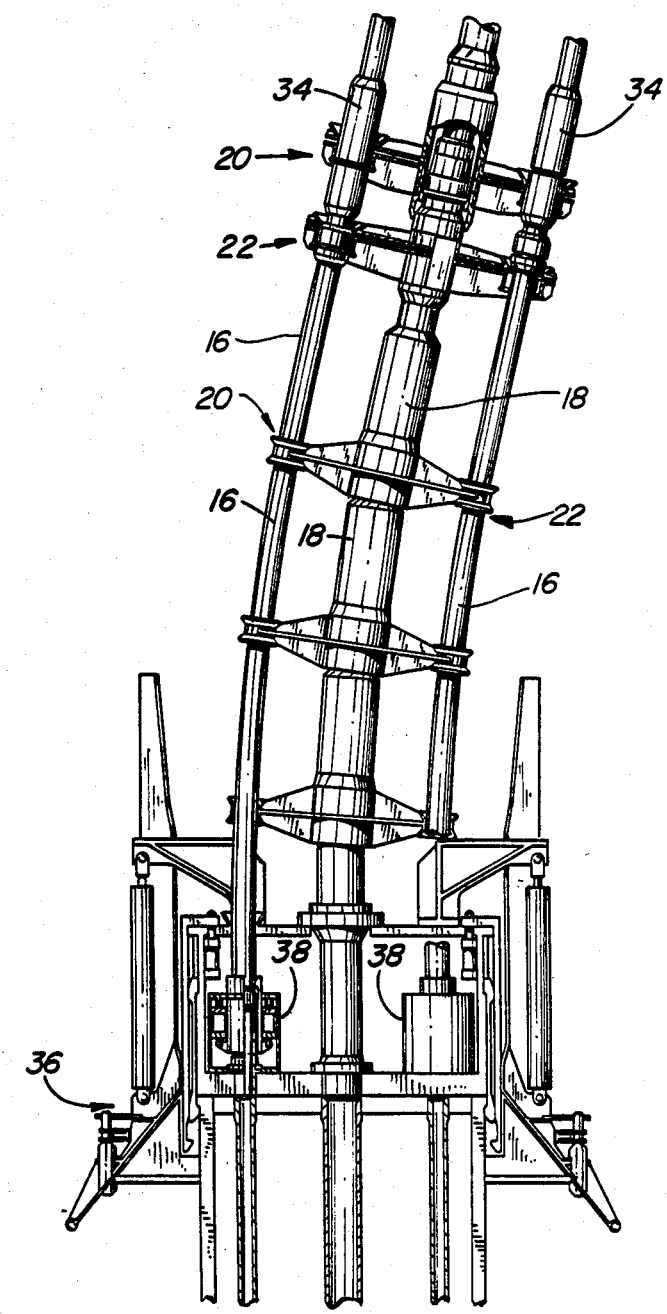
FIG. 8 is an elevation view, partly in section, showing the subsea base and a series of risers connected thereto.

Typically, when the riser is to be run from the surface vessel to the seabed, a riser joint is held vertically with its top end at the working floor of the surface vessel as seen in FIG. 1. The next section of riser joint is lowered, FIG. 3, and the tubes 16 and 18 stabbed onto the suspended riser tubes 16 and 18 FIG. 4. The outer tubing 16 is held to the central member at this point, i.e. the locking plate 26 is engaged in each tube locking groove 30. The tubes of one riser joint are locked to the tubes of the other riser joint by moving the sliding outer sleeves 34 as previously described and as shown in FIG. 5. Next, all the locking plates associated with this particular connection are moved to the unlocked position, FIG. 6. The outer tubes are thus only attached to the central pipe 18 by the connecting frame 20 at the top of the newly added riser joint. The riser is now lowered so that the top of the newly added joint is at the working floor of the surface vessel and another riser joint is added. Eventually the complete riser is run, locked to the equipment subsea as seen in FIG. 8 and each individual tubing string tensioned at the surface, when the final locking plate is moved to the unlocked position. If necessary for repair, an individual tube can be pulled to the surface once this has been done as shown in FIG. 7.

Figure 9:
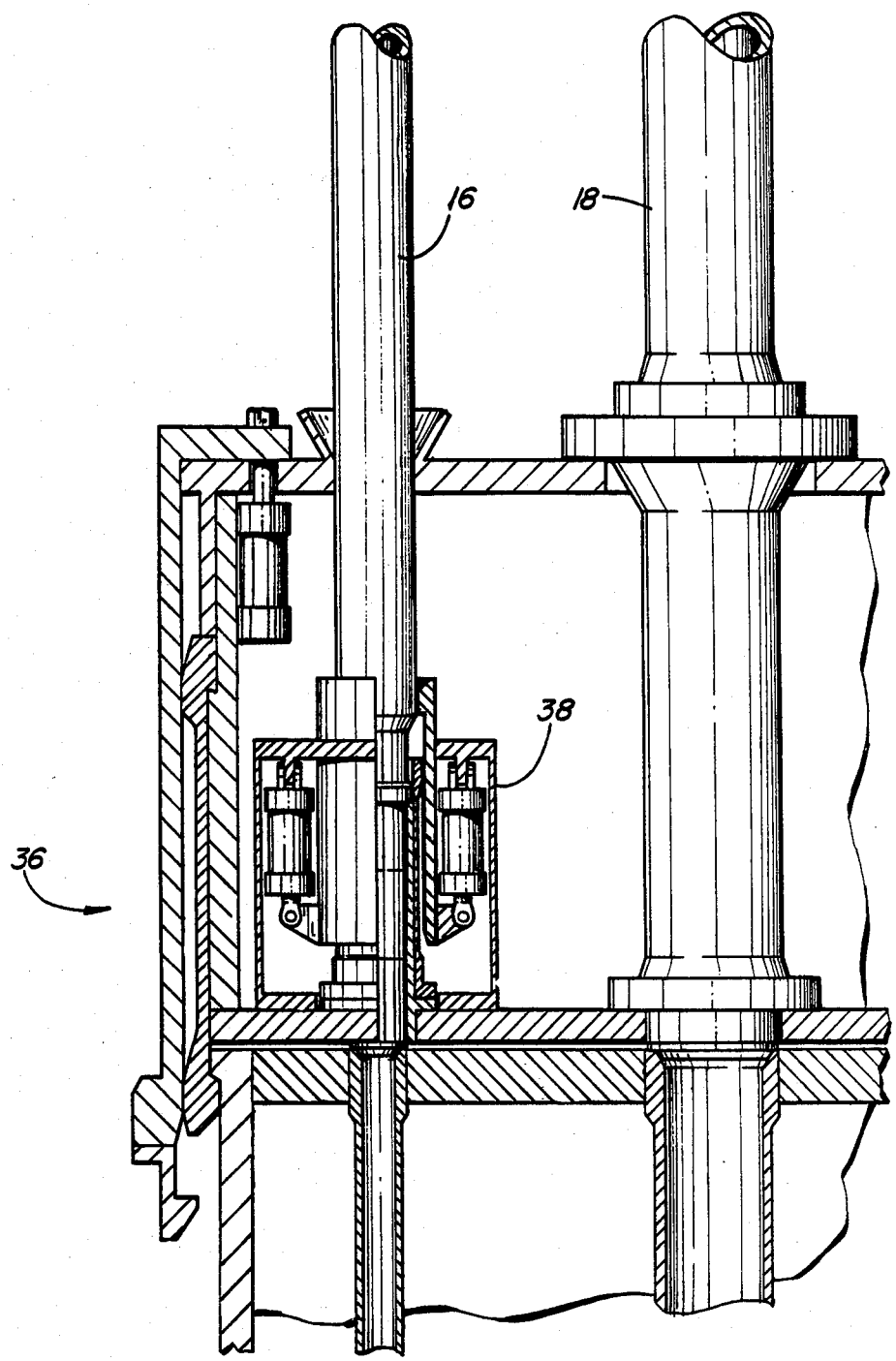
FIGS. 9 and 10 show, respectively an individual tube being locked to, and then unlocked and pulled from, the base.
Figure 10:
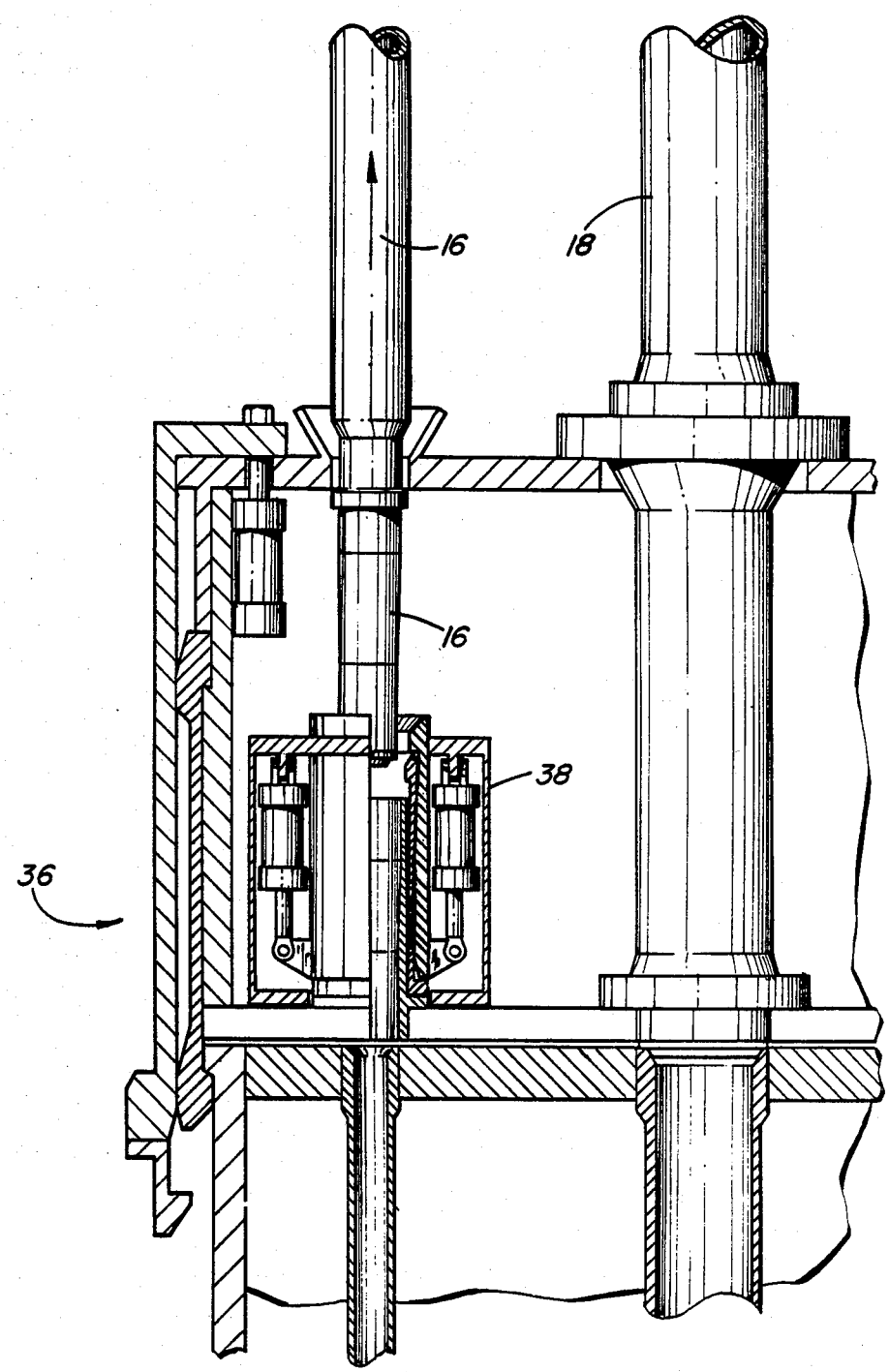

In order for the system to be practical the connectors 34 joining each length of the outer tubing 16 must be relatively small in diameter. Since these are operated manually at the surface vessel, this is achievable. The connector that locks the tubing to the subsea equipment must be remotely operable which usually means the connector will be larger than the intermediate connectors. To overcome this problem a subsea connector is proposed whereby a single large connector locks all the outer tubes and the central pipe to the subsea equipment. Each outer tube is in turn locked to an intermediate connector 38. The locking mechanism for the tube is part of a large connector 36 (FIGS. 8, 9 and 10). This arrangement has two advantages. First, only the end of the tube is retrieved when an individual tube 16 is pulled to the surface, i.e. the individual connector 38 remains behind. Second, the connector activating power (typically hydraulic) need not be supplied down each individual tubing string. Instead it is supplied down a common power/communications line that is part of the riser. This common power line can be retrieved if necessary for repairs. Thus, pulling an individual tubing string to the surface does not involve any difficult handling and reconnection of power and control lines.

Riser Connector

In use risers are subjected to loads due to waves, currents and the risers own weight. These loads cause the riser to bend. In order to keep the bend or sag to a minimum the riser is tensioned. Because the external loads fluctuate the loads and stresses within the riser also continually fluctuate.

There are two common problems with risers. Firstly, the connectors fail due to fatigue as a result of the fluctuating loads and secondly, the connections are prone to leaking especially under high internal pressures. One aspect of the present invention seeks to overcome these two problems.

When joints of pipe are made up (or joined together) the end of one joint of riser is sufficiently large in diameter to slide over the end of the other joint of riser. The larger end of the riser is referred to as the box and it slides over the smaller end referred to as the pin. Locking dogs on the inside of the box engage in a groove on the outside of the pin. The locking dogs are thus in between the box and the pin and are activated by screws that penetrate from the outside of the box. This type of connection is the most common riser connection in use today. It is quickly and easily made up and provides reliable service in most operational circumstances. But in severe environments it is prone to fatigue failure mainly caused by the inherent large offsets in the load-path.

Figure 11:
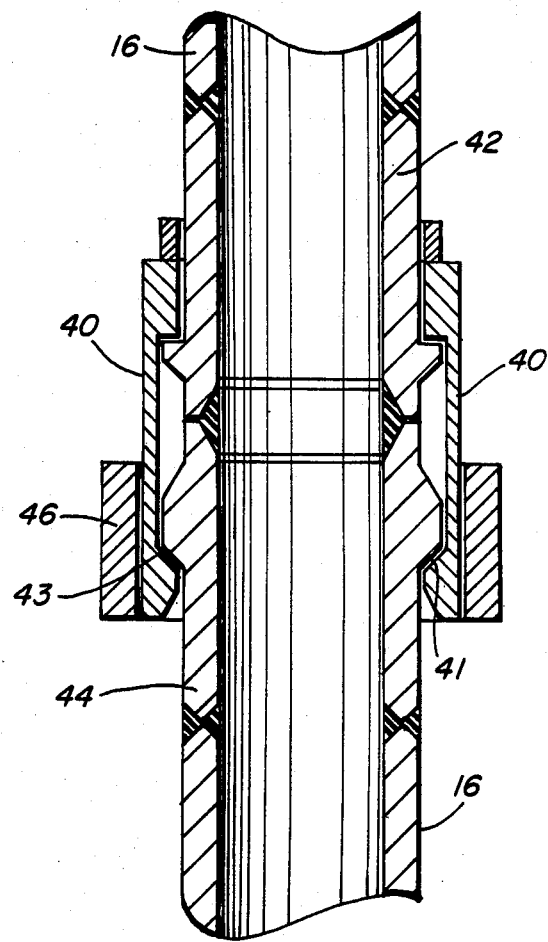
FIG. 11 is a sectional view of a basic collet connector.

Many alternative types of connectors have been proposed to overcome the loading problems described above and one that shows good possibilities is the collet connector. Here the box goes over the pin as before but a clamp on the outside of the box and pin holds the components together as shown in FIG. 11. The basic theory behind this design is well known. In order to have good fatigue characteristics the tensile stresses are kept to a minimum and the fluctuation of the tensile stresses are also kept to a minimum—it being tensile stresses that in general cause fatigue. Keeping the fluctuations of the tensile stresses low is achieved by ensuring that the connection is preloaded and that the tensile preloaded cross-sectional area is small relative to the compressive preloaded cross-sectional area.

Figure 12:
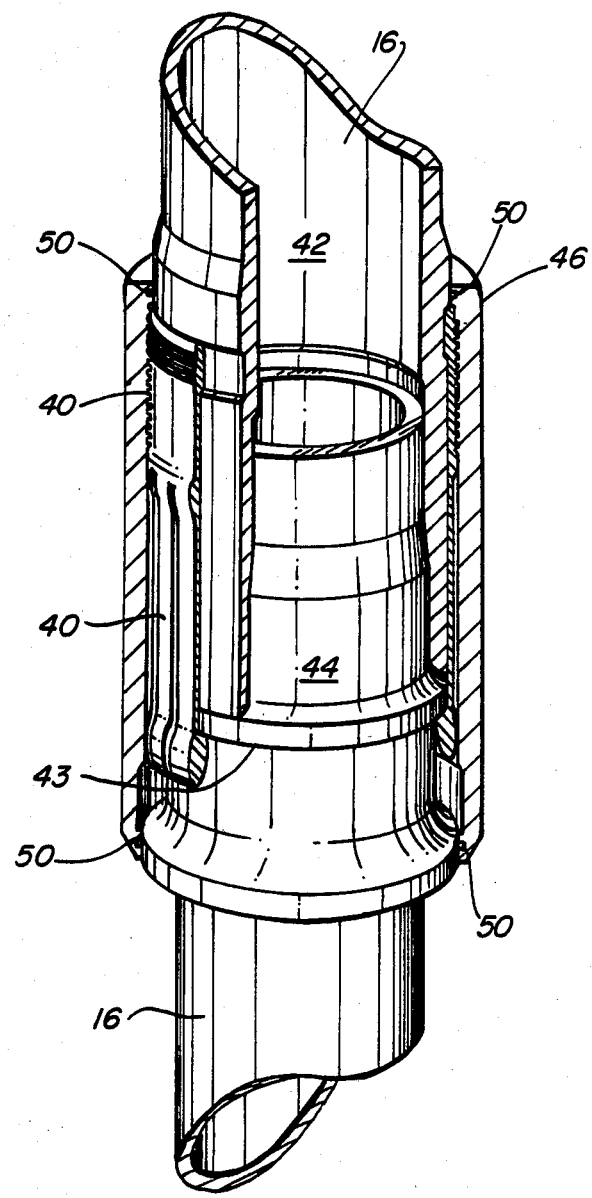
FIG. 12 is a perspective view of a collet connector according to the invention.

In accordance with the present invention a collet type riser connection has features that ensure that its inherently better fatigue characteristics will work. As shown in FIG. 12 the box-over-pin length (42 over 44) is made sufficiently long to ensure that the bending loads are taken through this engagement with minimum stresses. The tensile loads are taken by a long finger collet 40 on the outside of the box 42 and pin 44. The length of the finger collet is sufficient that the strain in it due to the deflection of the box over pin resisting bending is very small. Thus the finger collet 40 which is the tensile carrying part of the connector receives only very small stress and stress fluctuations due to bending loads.

It was mentioned earlier that preloading the connector is a basic principle for achieving good fatigue characteristics. The present invention provides a method of ensuring the correct preload is applied to the connector each time it is made up. Where screw or wedge systems are used the amount of preload is dependent on the skill and conscientiousness of the operator. In the present invention the load faces of the collet 40 are sloping, similar to existing designs. During engagement of the connector the load face 41 on the collet 40 engages with the load face 43 on the pin 42. Full engagement does not take place because the finger collet is made purposely short. Full engagement is achieved when the outer locking sleeve 46 is pushed over the finger collet 40 and the sloping load faces 41, 43 act as a wedge and stretch the finger collet.

Figures 13, 13A:
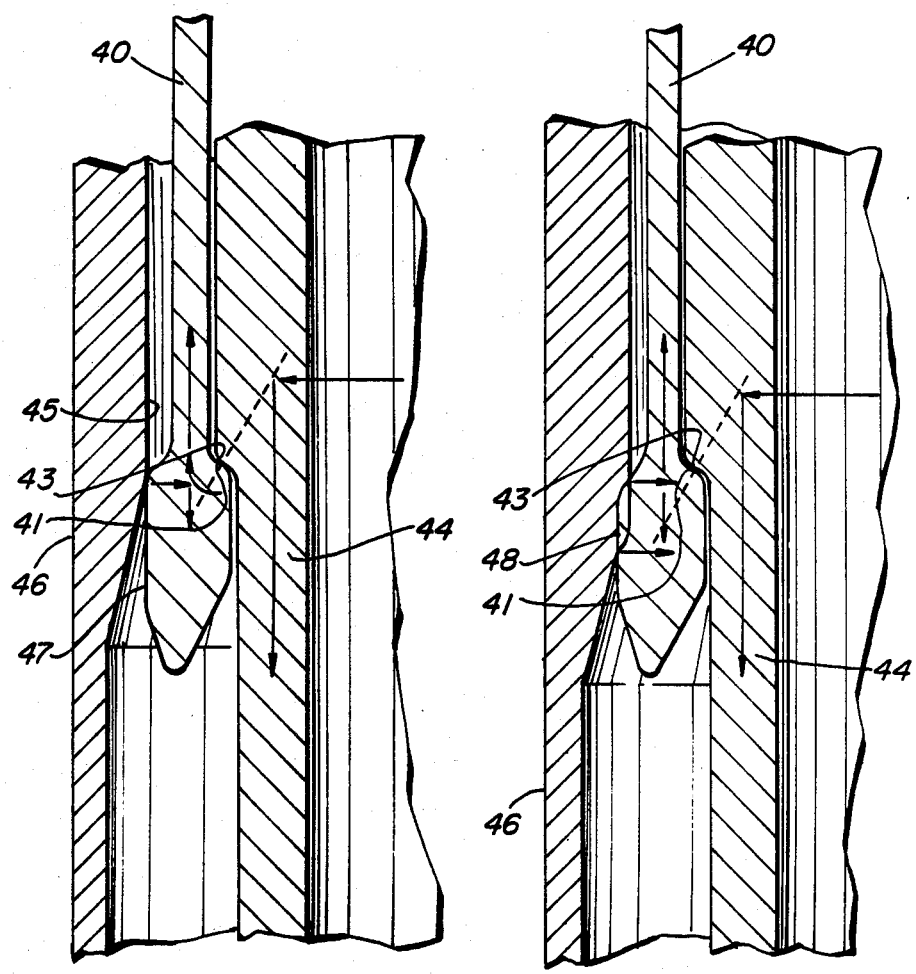
FIGS. 13 and 13a show collet finger bends due to out of balance forces.

In some designs the locking sleeve 42 and the outer face of the collet 40 also have a very shallow taper to avoid having very tight tolerances. However this means that the position of the locking sleeve determines the amount of preload in the collet. In the present invention the faces 45 of the sleeve and 47 of the collet are parallel to the sleeve motion as seen in FIG. 13. The locking sleeve 46 therefore only has to be within a large positional range to ensure that the correct preloading is applied. The long collet means that very tight tolerances are not necessary because the long collet reduces the variation in the stretch of the collet to a small strain and thus a small stress. In order to make the locking sleeve and collet work satisfactorily during engagement and disengagement, a step or steps 48 are introduced as seen in FIG. 13a. The step ensures that the loads are always balanced and the latching part of the collet is not subjected to excessive bending at the critical point of a disengagement.

One disadvantage of the finger collet 40 is its potential risk of damage. The fingers of necessity are thin—to get the correct tensile and compressive areas and also to allow the collet fingers to flex for engagement and disengagement. The present invention protects the collet fingers in two ways. Firstly, the locking sleeve 46 completely covers the collet fingers in both the locked and unlocked position. Secondly, the direction of movement during the locking motion is the direction that causes tension in the collet fingers. In the unlocking motion the tension is relieved. Thus the thin fingers are protected from being subjected to compressive loads that would buckle the fingers. The locking sleeve 46 is also configured with seals 50 at both ends to ensure that the inner workings of the connector are protected from the environment.

Figure 14:
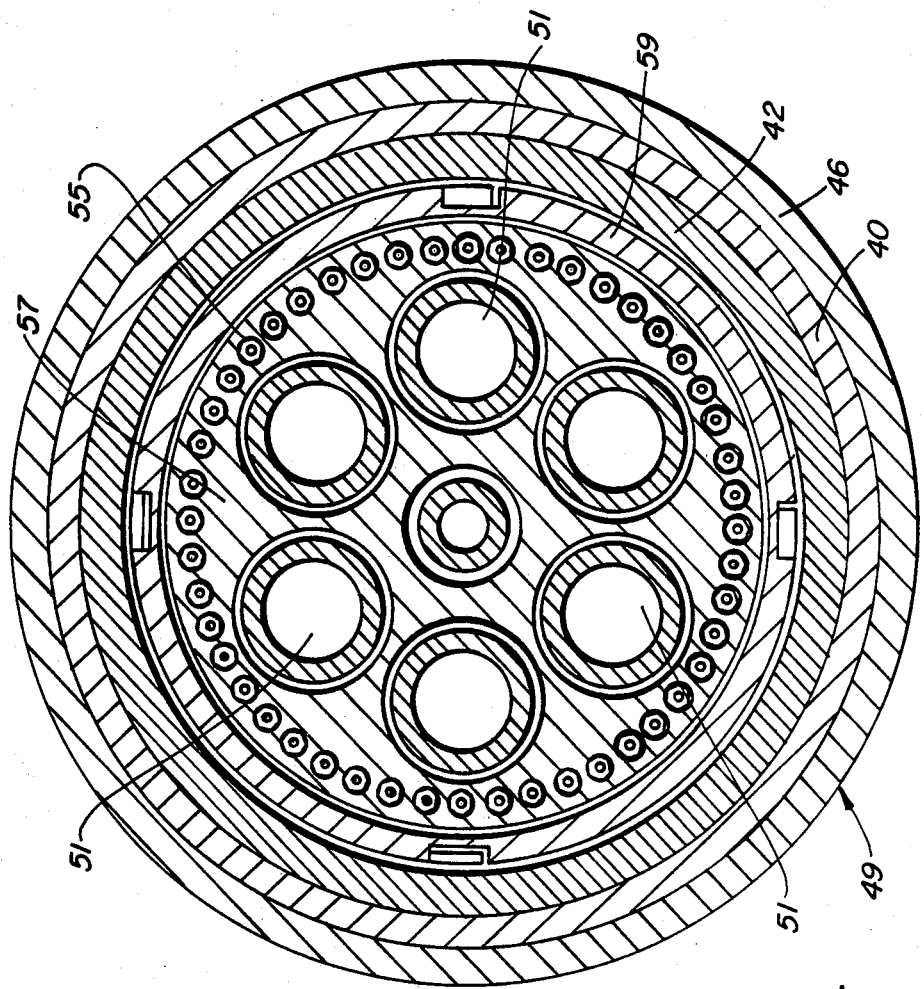
FIGS. 14 and 14a are elevation and sectional views respectively of the internal tubing in a production riser.
Figure 14A:
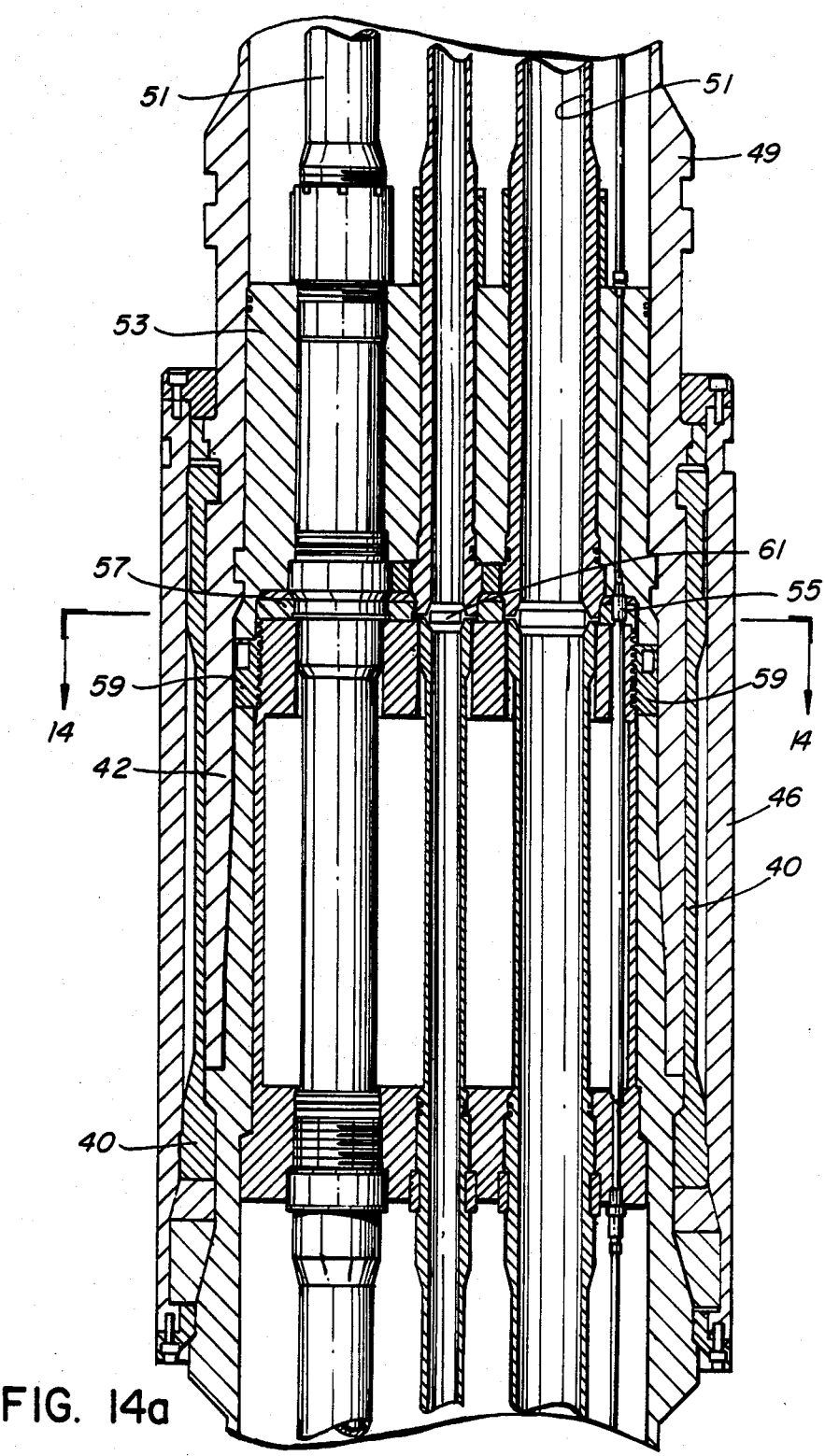
Figure 15:
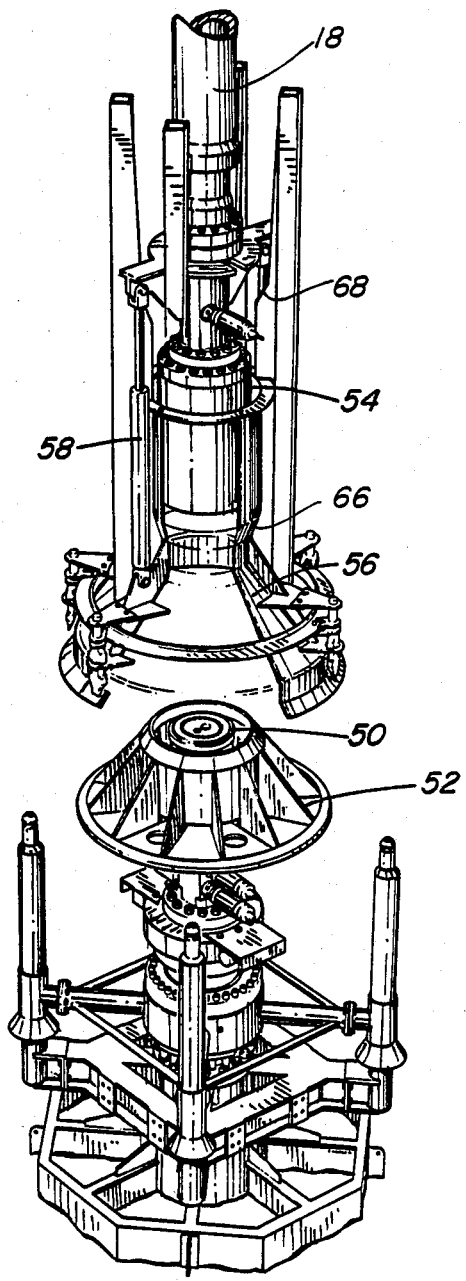
FIGS. 15 through 21 illustrate the mechanism for connecting and disconnecting a riser to a subsea installation; and, FIGS. 22 through 32 inclusive illustrate a high angle and multi tube flexjoint.

So far the structural connection of riser joints has been considered. Some risers consist of several pipes or tubes. When multiple tubes are used there are potential sealing problems especially at high pressures. A typical riser with multiple tubes is shown in FIGS. 14 and 14a and is one where an outer pipe 49 contains several tubings 51 inside. These are sometimes referred to as completion, workover or composite risers. The connector described earlier is used for structurally joining the joints of the riser together, i.e. the connector joins the structural outer pipes together. Normally there is no structural connection of the inner tubing. Where the tubes join seals are provided. These seals are usually elastomeric since relatively low pressures are used. For higher pressure (typically 10,000 psi) and long service life, metal seals are preferable. However, metal seals require very accurate tolerances. When only one pipe or tube is being joined these tolerances are reasonable to attain. But where multiple seals are required in the same block, the additional positional tolerances are unrealistic. The present invention minimizes this problem. As shown in FIGS. 14 and 14a each individual pipe 51 is held in a block 53 at the ends to its outer pipe 49. At one end the tubes 51 are allowed to project through the block 53. The amount that the pipe projects through the block is sufficient to allow the end of the tube to deflect from side to side as a cantilever. FIGS. 14 and 14a also illustrate the hydraulic line connectors 55, seal protection plate 57 and nut right 59.

When the end of one riser joint is brought into contact with another riser joint the tubes 51 extending from the block 53 will deflect slightly as the taper on the metal seal 61 engages in the preparation on the other tube. This way any imperfection in the lateral positional location of the tubes 51 will be accommodated. The length of the tubing extending from the block 53 is sufficient to give low stress and seal contact forces.

The lateral tolerances have been covered in the above description. Longitudinal tolerances are also important. For very long tubing such as used in the riser it is impractical to achieve the length tolerance required for the metal seal. The tubing is therefore stretched between the two end blocks. This has two effects. Firstly, it overcomes the tolerance problem since only the short length of tubing projecting beyond the one end block requires to be closely toleranced. Secondly, it overcomes a thermal stress problem. The tubes are restrained at either end. When hot hydrocarbons flow through the tubes they will expand and buckle. With the tubing slightly tensioned the thermal expansion will relieve the initial preloading and the resulting compressive load will be a magnitude that is manageable with tubing supports. The thermal expansion of the tubing extending through the end block as well as the pressure in the tubing is a measurable and predetermined load when considering the sizing and fatigue characertistics of the collet connector.

Reference should now be made to FIGS. 15 through 21 inclusive.

When equipment is lowered to the seabed it is usually guided to its correct location by guidewires connected to guideposts on the subsea installation. In deep water the task of installing the guidewires, keeping them tensioned and untangled becomes difficult. In recent years the oil industry has used guidelineless drilling techniques for deepwater exploration. These techniques usually involve some form of guidecone to pull the equipment to the correct location as it is lowered onto the subsea installation.

The most common use of these techniques to date has been in lowering blowout preventers (BOP) to a subsea wellhead. In this instance the riser or drillpipe that is supporting the BOP is kept vertical by the large weight of the BOP. As confidence is gained through experience in guidelineless techniques these techniques are expected to be used for other tasks where higher riser angles from the vertical are expected. The present invention concerns the connection and disconnection of risers or other subsea equipment when they are at an angle to the vertical. The usual causes for the riser to be at an angle are either the current forces acting on the riser prior to connecting subsea, or the surface vessel being off station while the riser is disconnected subsea.

Another problem associated with connecting equipment subsea is vertical motion. The surface vessel moves up and down with the waves and although motion compensation for the riser is provided all vertical motion is usually not removed.

The solution to the problem of attaching a riser that is at an angle is to provide a righting moment to bring it to vertical. At small angles the locking mechanism of the connector can provide this moment. But at higher angles the connector will not be able to engage properly in order to provide the moment.

With the riser at an angle and locked onto the subsea installation it is possible for the connector to jam on the subsea mandrel when it is released in such a manner that the more the riser is pulled the more the connector jams.

An object of the present invention is to provide a mechanism for reliably connecting and disconnecting a riser or other equipment when it is at an angle to the vertical and subjected to vertical motion. The installation (FIG. 15) consists of a mandrel 50 surrounded by a cone 52 on the subsea installation with a connector 54 and a guideframe 56 on the lower end of the riser. The guideframe 56 is attached to the riser by hydraulic cylinders 58 such that the guideframe has freedom to move vertically relative to the riser, and also be at an angle to the centreline of the riser. The guideframe 56 engages will the cone 52 and the riser connector engages with the mandrel.

Figure 16:
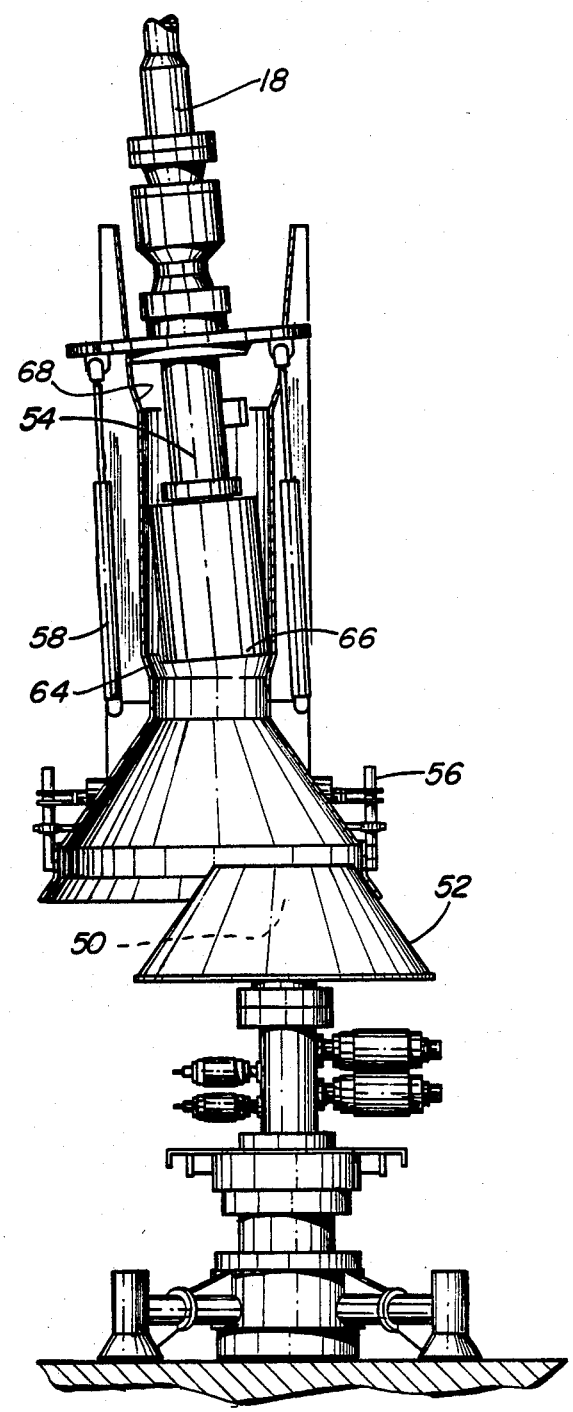

The normal sequence of events is as follows. The riser is lowered toward the subsea installation. Position sensing equipment indicates the relative positions of the end of the riser and the subsea installation. If a large discrepancy exists the surface vessel is moved. For smaller discrepancies, a jet on the side of the riser is activated and pointed in the correct direction by turning the riser. The jet (not shown) pushes on the riser until it is within the capture radius of the subsea mandrel/cone 52 as shown in FIG. 16.

Figure 17:
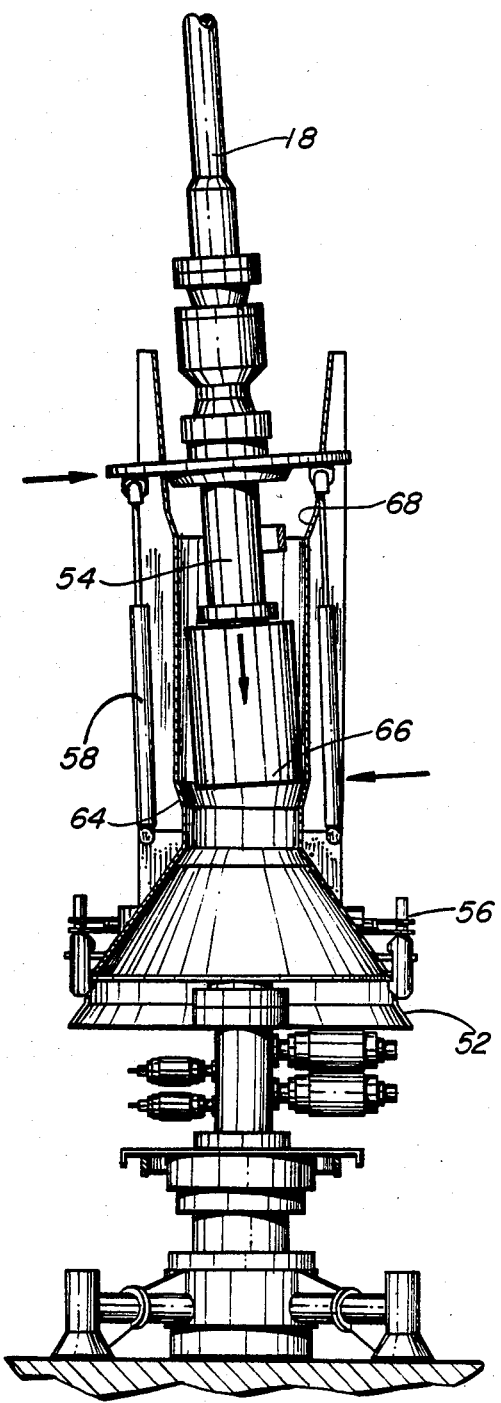
Figure 18:
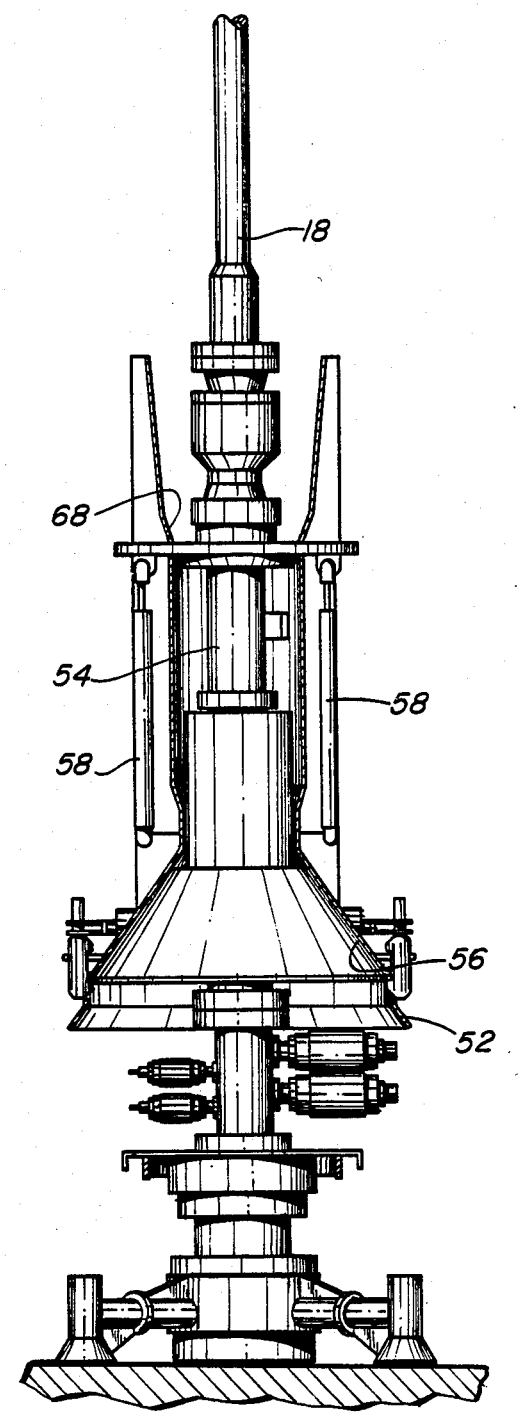
Figure 19:
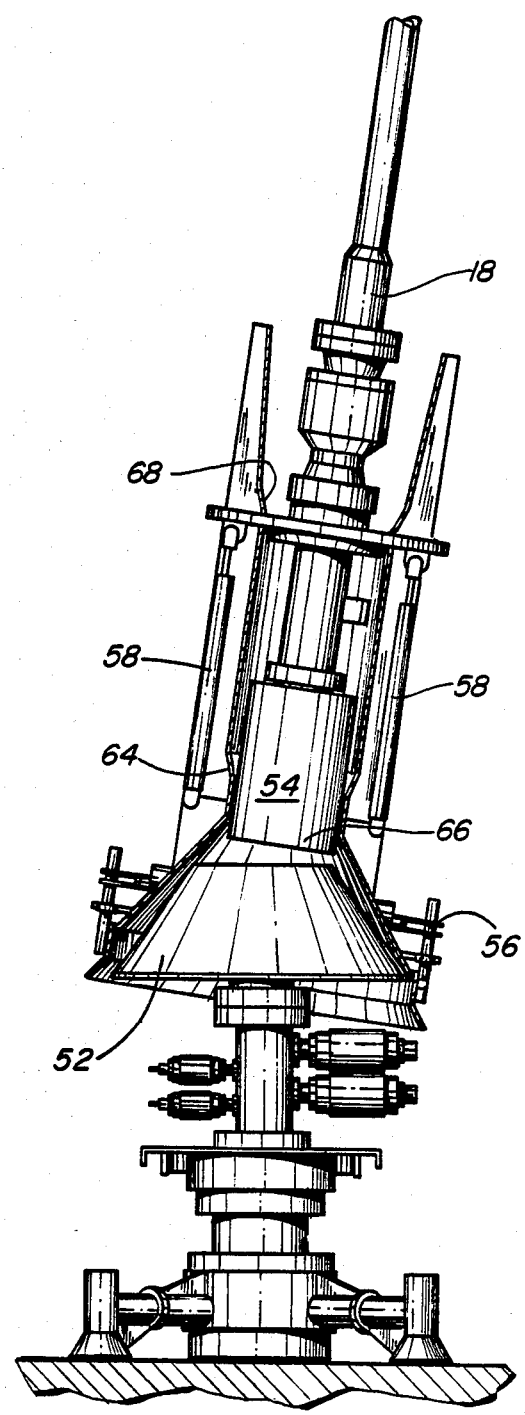

The riser is then lowered until the guideframe 56 engages and lands on the cone 52 FIG. 17. As the guideframe lands on the cone it aligns itself with the cone—as will be described later. The riser is still at an angle and also moving vertically due to surface vessel motion. Normally motion compensators are provided on the surface vessel, but with the riser not attached subsea it extremely unlikely that the compensators will be able to respond precisely. With the guideframe landed on the subsea cone the guideframe will remain stationary and the riser will move vertically relative to it. The hydraulic system for the hydraulic cylinders 58 connecting the guideframe to the riser can be arranged so that either no force is transmitted or a limited force is transmitted—this is discussed later.

The next step is to lock the guideframe 56 to the subsea cone and to rotate the riser to the correct orientation. The clamps locking the guideframe to the subsea cone do not tightly hold the parts together. The guideframe can therefore be rotated on the subsea cone until a sprung key or stop is engaged. Next the hydraulic system is operated from the surface vessel and the hydraulic cylinders 58 pull the riser down onto the mandrel 52 in the centre of the subsea cone. As the riser/connector 54 moves down the guideframe the shape provides contact points that give a moment to the riser and the riser is forced to a vertical position just prior to engagement with the mandrel FIG. 17. Finally, the connector is locked to the mandrel FIG. 18 and the guideframe clamps are released.

When it is required to release the riser from the subsea equipment, the riser connector 54 is released. If the riser is at an angle the side forces that would normally cause the connector to rotate and jam are taken by the guideframe 56. Under this loading the guideframe essentially pivots about its outside edge and rotates off the cone moving the connector in a controlled direction FIG. 19. The lower the height of the cone relative to its diameter the more effective is this feature.

Some Specific Features of the Invention

Figure 20:
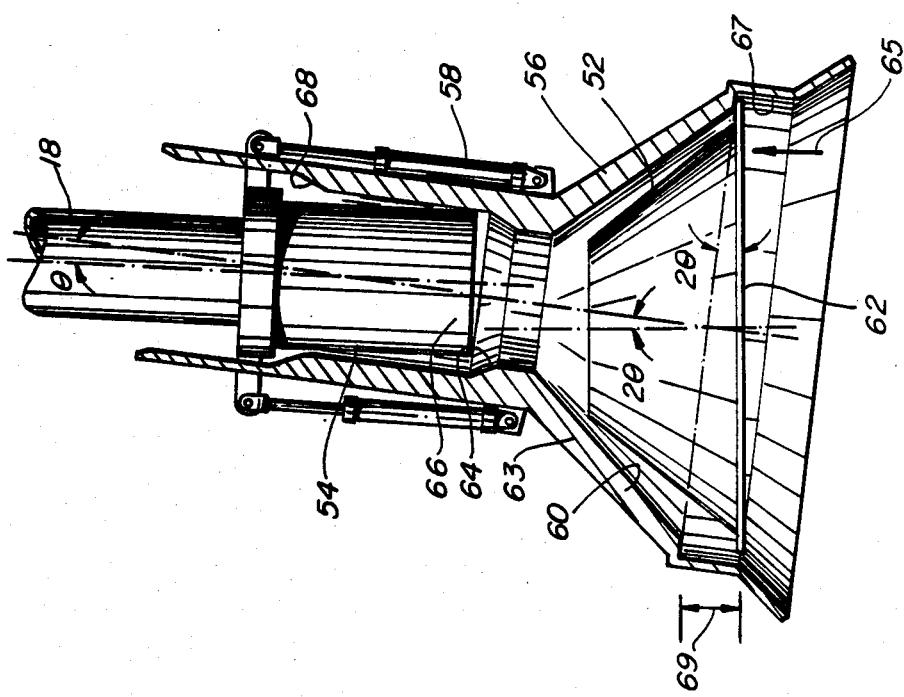

The basic objective is to provide a means of connecting a riser that is at an angle to the vertical and moving up and down. The forces required to move the riser are beyond those available with available connectors. A guideframe is therefore provided that locks to the subsea equipment and is independent of most of the riser loading. FIG. 20 illustrates how the guideframe functions. The guideframe 56 slides down the subsea cone 52 to position itself in the correct lateral location on the subsea cone. The riser 18 also moves laterally with the guideframe 56 but the forces involved are small. When the guide cone 63 reaches the position on the subsea cone 52 illustrated in FIG. 20, one part of the guideframe 56 will be in contact with the horizontal lip of the subsea cone 52. This contact point is shown in FIG. 20 as the vertical reaction point, arrow 65. The weight of the guideframe 56 and the vertical reaction with the subsea cone 52 provides the moment required to align the guideframe with the subsea cone, i.e. bring the guideframe to a vertical position. The aligning moment must overcome other contermoments (e.g. those caused by the horizontal force of the riser) but this is only a matter of calculating the required weight.

In order to ensure that the guideframe 56 contacts the horizontal lip of the subsea cone 52 and thus generates the vertical reaction 5, a horizontal reaction surface 67 is provided on the guideframe. The height 69 of the horizontal reaction surface on the guideframe must be sufficient to ensure that it will always contact the outer lp 62 of the subsea cone 52 for all expected guideframe angles. This angle is essentially up to twice the maximum expected riser angle because the guideframe 56 has to have freedom to move in all directions relative to the riser. In the worst case the freedom of movement of the guideframe will be in addition to the riser angle. Thus, the guideframe 56 aligns itself with the subsea cone in a controlled and predictable manner.

With the guide cone 60 aligned with the subsea cone, 52 clamps (not shown) lock the guideframe 56 to the subsea mandrel 50. These clamps are located in the area of the horizontal reaction surface 67 on the guideframe and hook under the outer lip 62 of the subsea cone 52. (The riser and guidefrme can now be rotated if this is required, as described previously).

There is now a structural link betwen the riser and the subsea installation which allows the riser to be aligned with the subsea mandrel. As the hydraulic cylinders 58 pull the riser 18 and connector 54 through the guideframe 56 the profiles of both are such that the contact points 64, 68 are far apart in height. This is illustrated in FIG. 17. The lower contact point 64 of the guideframe directs the lower part 66 of the connector 54 toward the centre of the guideframe. The same happens with the upper contact point 68. Thus the two contact points provide the moment necessary to align the riser 18 with the mandrel, i.e. to straighten up the riser to a vertical position.

Figure 21:
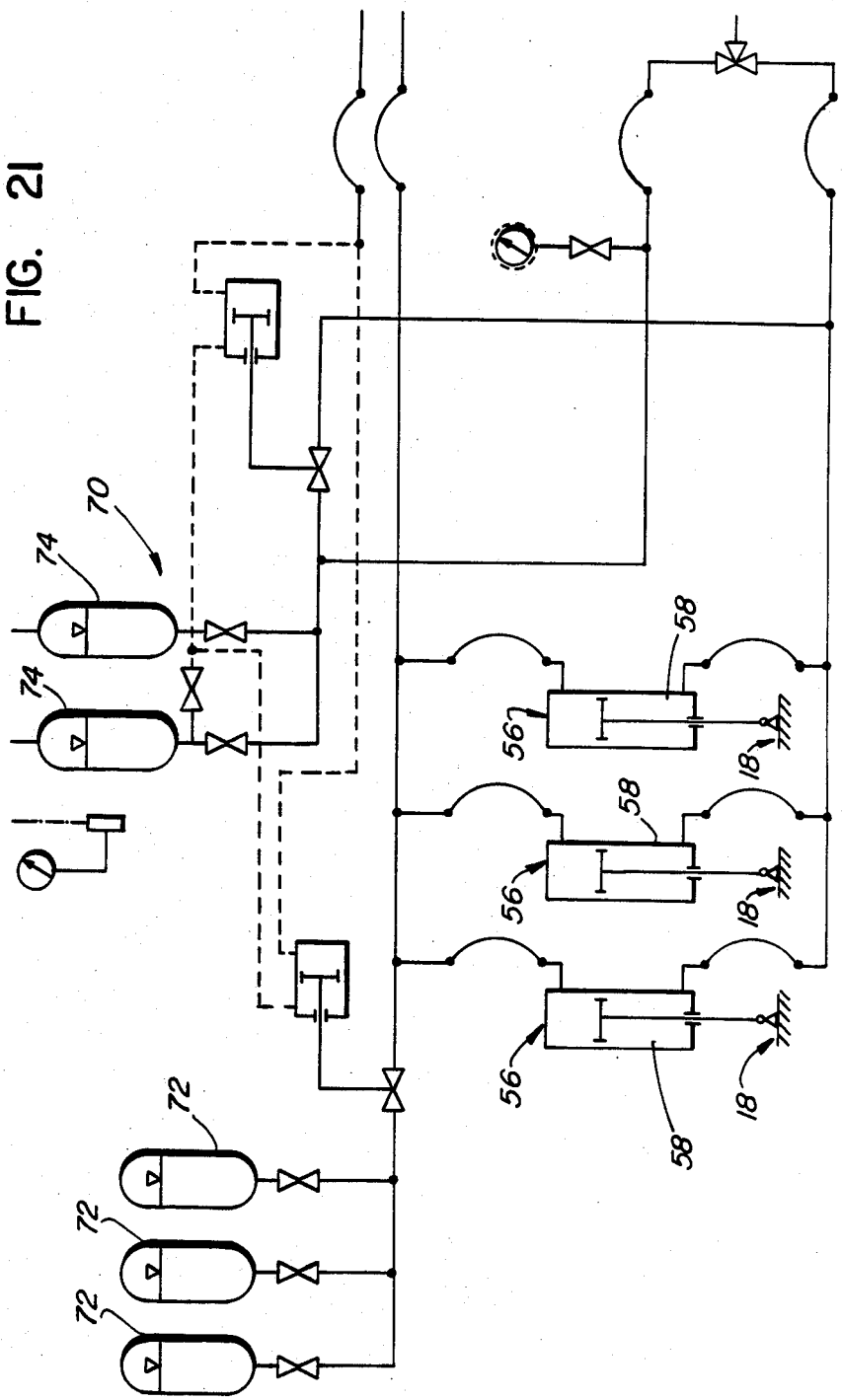

FIG. 21 shows a hydraulic circuit for controlling the hydraulic cylinders 53 that connect the guideframe to the riser. There are several ways these cylinders can be used. When the guideframe is landing on the subsea cone it is possible to have no hydraulic force being generated by the cylinders so that there is no force transmitted between the guideframe 56 and the riser 72. Another mode of operation is one where some force is transmitted by the cylinders to help the motion compensation equipment 70 on the surface vessel. It was mentioned earlier that usually risers are supported at the surface vessel by motion compensators. When the riser is not connected there is nothing for the compensation system to react against other than the mass of the riser. It is therefore proposed to adjust the number of accumulators 72 and their precharge so that the force transmitted by the hydraulic cylinders will vary depending on the extension of the cylinders. Thus, as the riser rises or falls, the load input to the riser from the cylinders 58 will change and thus trigger a reaction in the surface vessel motion compensators 72.

FIG. 21 shows the accumulators 74, located on the guideframe, directly connected to the hydraulic cylinders 58. It also shows the valving necessary to shut out the accumulators and control the hydraulic cylinders directly from the surface vessel as is required when the riser is stabbed onto the subsea mandrel.

Reference should now be made to FIGS. 22–32.

Because vessels floating on the ocean move under the action of wind, waves and current, it is necessary for risers 18 connecting the floating vessel to the seabed to contain joints that will flex and accommodate this movement. This is easily achieved for a single tube operating at low pressure, but the problem is considerably more complex for a bundle of high pressure production pipe contained in a structural casing.

The solution for a single pipe is usually a ball joint or "Murdock" flexjoint. A Murdock joint is a proprietory device (patented) that has a point flexure similar to a ball joint but is made up as a composite of metal and elastomers. Its main advantage is that there are no sliding parts and this eliminates most of the failure modes of ball joints.

When considering multiple tubes it is impractical to consider ball joints, etc., because the spacing between tubes becomes so large. It is possible to produce a "Murdock" joint with multiple passages, but the inherent simplicity of the joint is lost and tube spacing is larger than other parts of the total system usually require.

The most common or obvious solution is to run a bundle of tubes through a flexjoint so that the outer case has a flex and the internal tubing, being small, bend. The main disadvantage of this is that the internal tubes tend to be kinked at the point of flexure of the outer case. Because of this the so-called stress joint for the outer case has been used.

A stress joint is not really a jont at all. It is an outer case or pipe with a tapered wall thickness. When a side load is applied at the top of the stress joint, a bending moment is created in the pipe. The bending moment increases in proportion to the distance from the applied load. Thus at the bottom of the stress joint the moment is greatest and the wall thickness of the pipe is gradually increased along the length of the pipe to handle the increasing moment. The primary advantage of the stress joint is that it has a long, even curve when flexed so that internal tubing is not kinked as in the ball joint. However, it has a serious disadvantage in that it creates an extremely high bending moment at its base that, in most applications, is unacceptable. It has been proposed that the stress joint be made out of titanium which, having a modulus of elasticity about half that of steel, would have the bending moment for a given amount of flexure. Although this is a solution, it only applies to small diameter applications.

Besides the problems of achieving an acceptable method of flexing multi-tube bundles, there are two other requirements. First, there is a requirement for higher angles of flexure than in present practice, and second higher pressures are being required. For higher flex angles the problems described above with ball joints and stress joints are increased.

A further object of the present invention is to provide a flexjoint that can handle multiple internal tubes, flex to a high angle, handle high internal tubing pressures, and keep bending moments to a minimum. For high pressures, in the order of 10,000 psi, most elastomeric seals are reaching their limit of reliability. Metal seals are therefore assumed to be used in this invention since they impose further restrictions on flexjoints that this invention overcomes.

The invention consists of a series of flexjoints in the outer case with the high pressure tubing on the inside. The internal tubes are fixed at either end of the flexjoint assembly to the outer case, and have provision for metal seals for connecting to the next piece of equipment (e.g. a riser or connector). It is the arrangement or features of the flexjoints and internal tubing that make this approach practical.

In order to understand how the features work, it is necessary to understand the problems involved.

1. The internal tubes have a limit as to how much they can bend, primarily influenced by maximum allowable stress, diameter of the tube, and material (i.e. modulus of elasticity).

2. Because the tubes are restrained to a fixed length which is an inherent outcome of using metal seals, buckling stresses due to thermal loads appear.

Figure 22A:
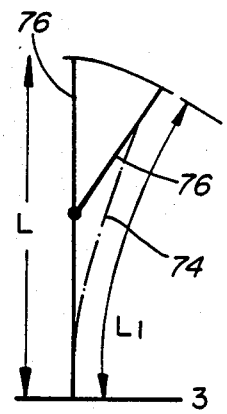
Figure 22B:
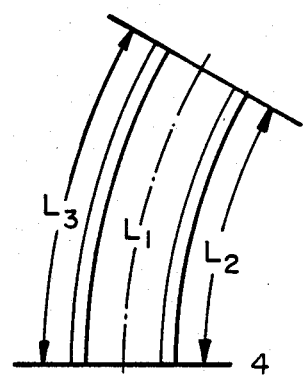

3. As shown in FIGS. 22a and 22b when the complete flexjoint is straight the outer case 72 and the internal tubes have the same length L. However, when flexing takes place, the outer case essentially kinks at a point, whereas the internal tubes 74 bend through a smooth curve 77, FIG. 24. The lengths along both paths between the fixed ends are different, but, since both the outer case and the tubes are joined at the ends, an additional stress is induced.

4. When the multiplex tubes bend some tubes will be nearer the centre of bend than others, thus the lengths along the arc of each tube will be different. Again, extra stresses will be introduced because of these different length changes.

5. With the internal tubes being pressurized and being fixed at the ends, a condition referred to as pressure bucklling will apply.

Figure 23:
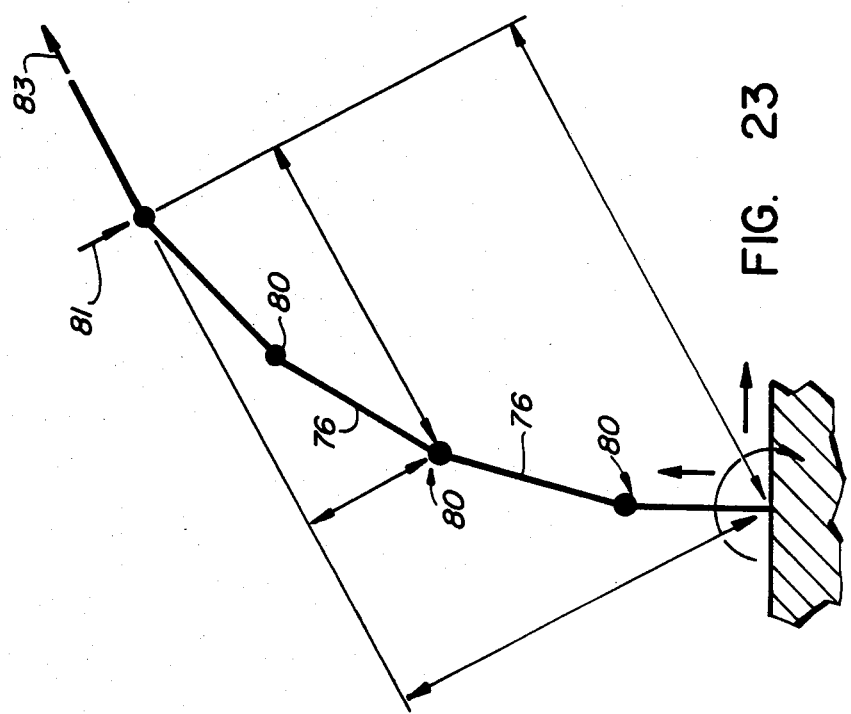

6. With multiple flex joints in the outer case as schematically shown in FIG. 23, the applied bending, shear 81 and tension 83 will cause the lower flexjoints to flex before the others.

These conditions are summarized and illustrated in FIGS. 22a and 22b where length $L_1$, bending, is less than length $L_2$, potential buckling due to thermal forces; $L_3$ being the length change due to centreline Kink.

Figure 24:
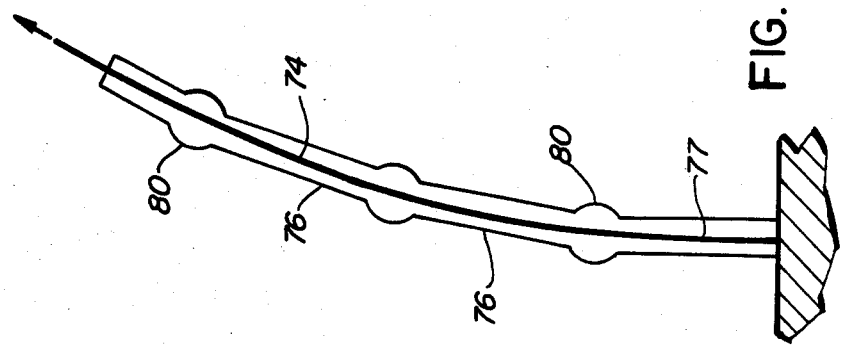
Figure 25B:
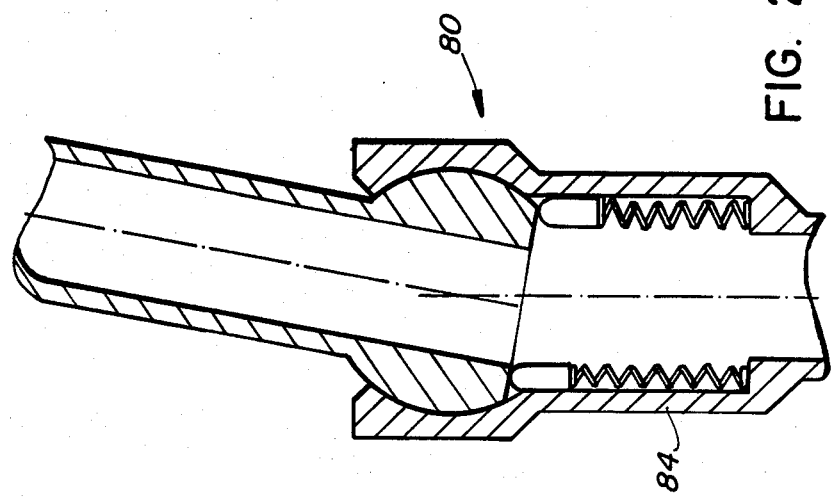
Figure 25A:
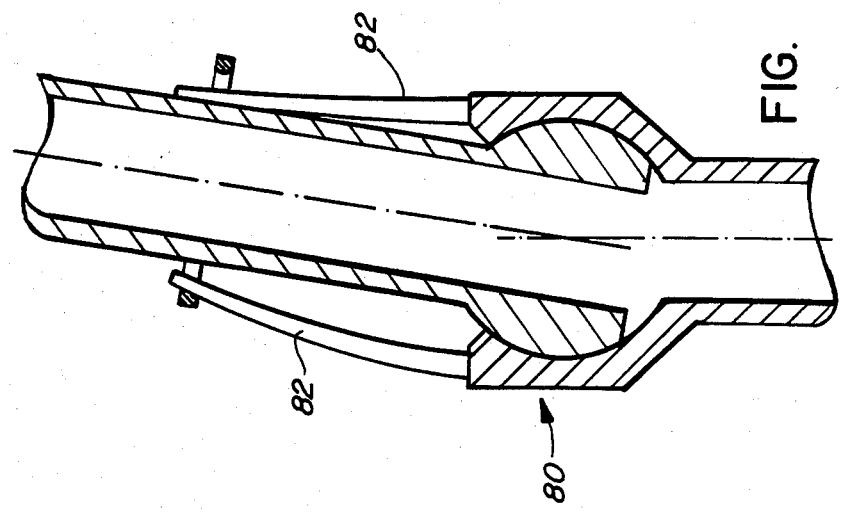
Figure 26B:
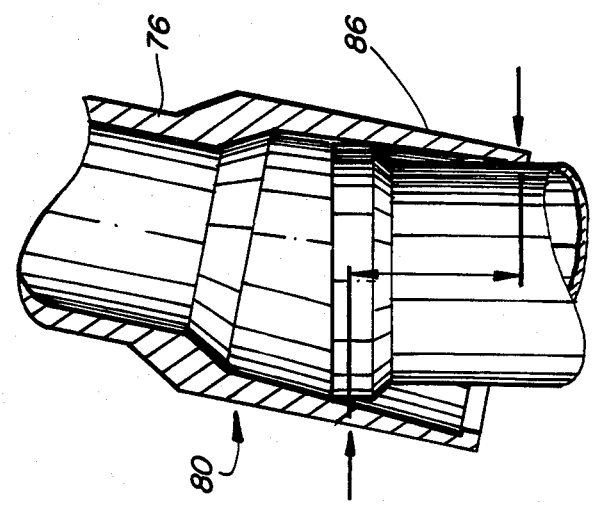
Figure 26A:
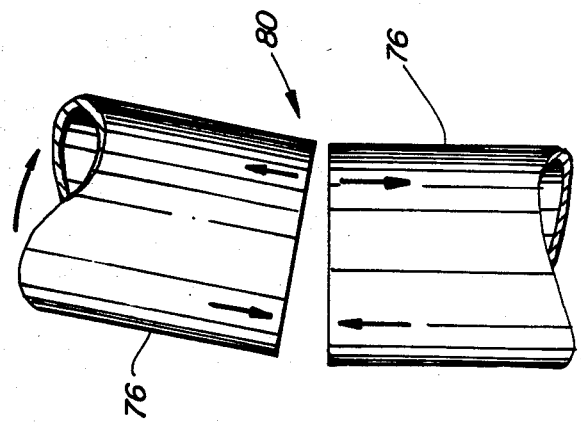
Figure 27:
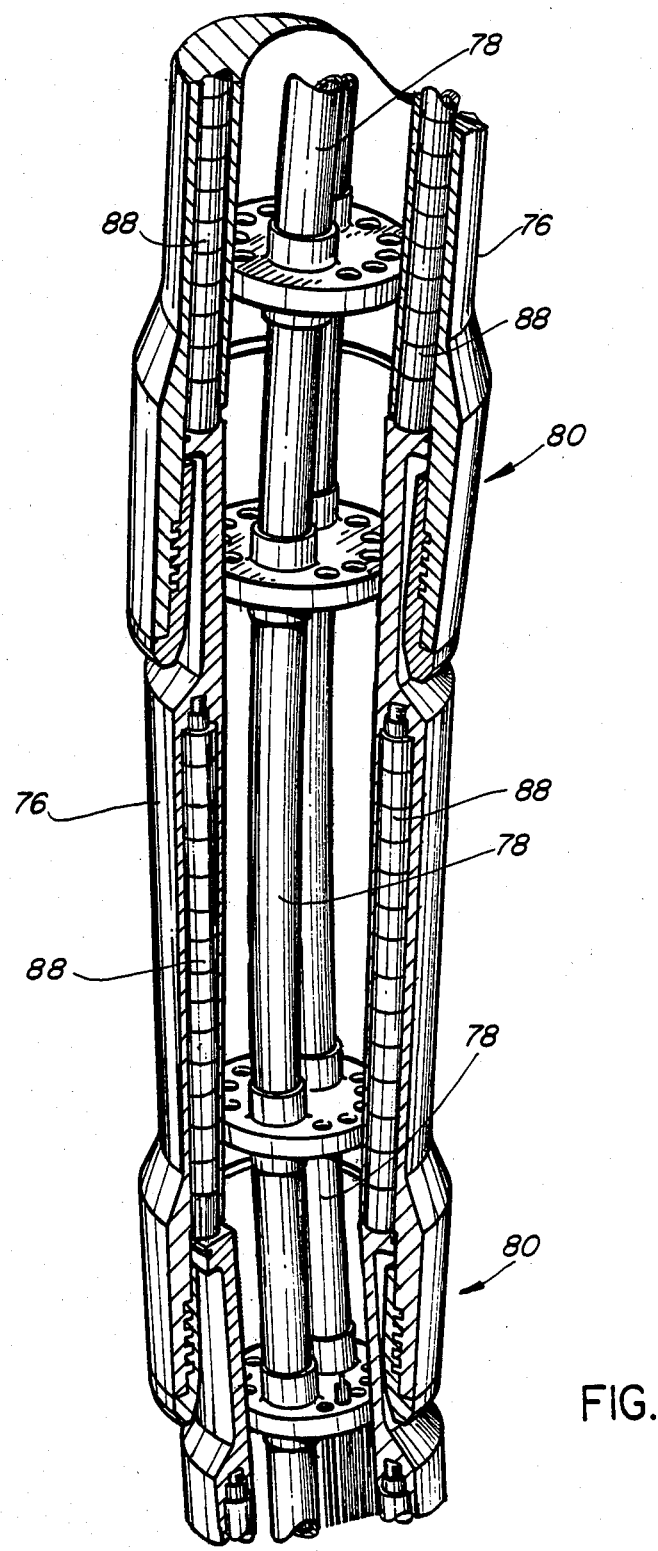
Figure 28:
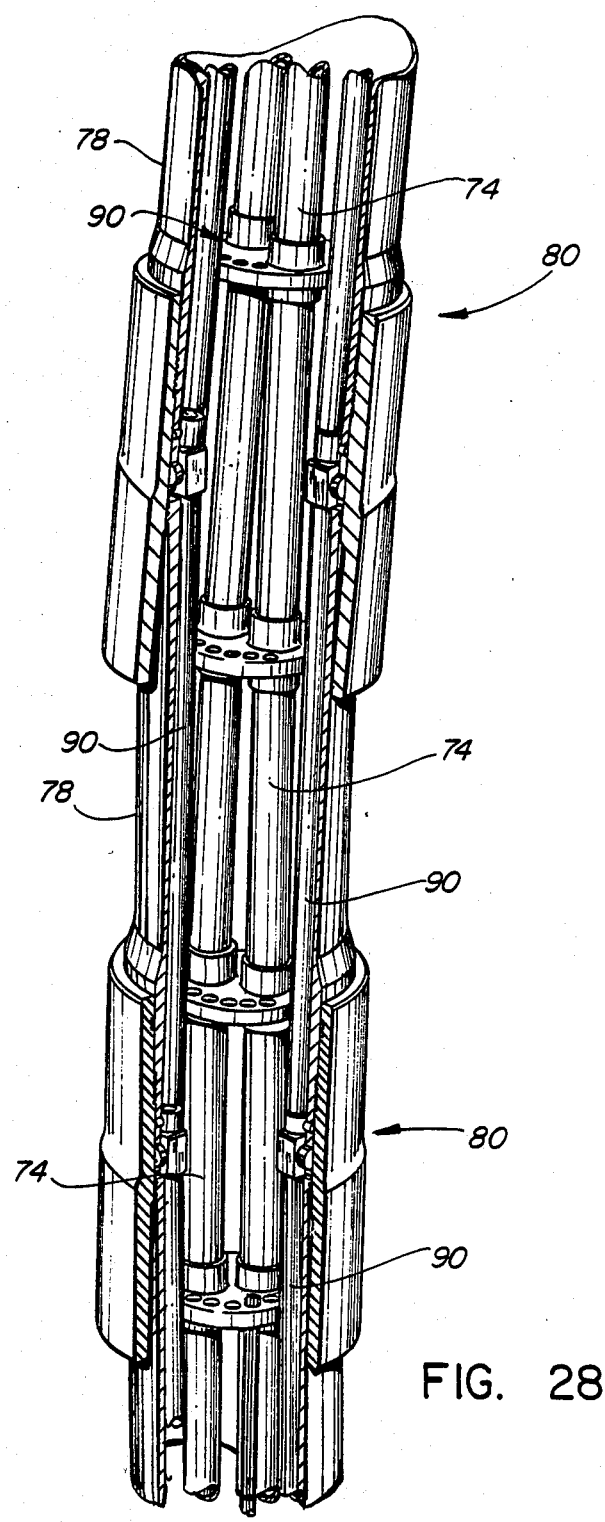
Figure 29:
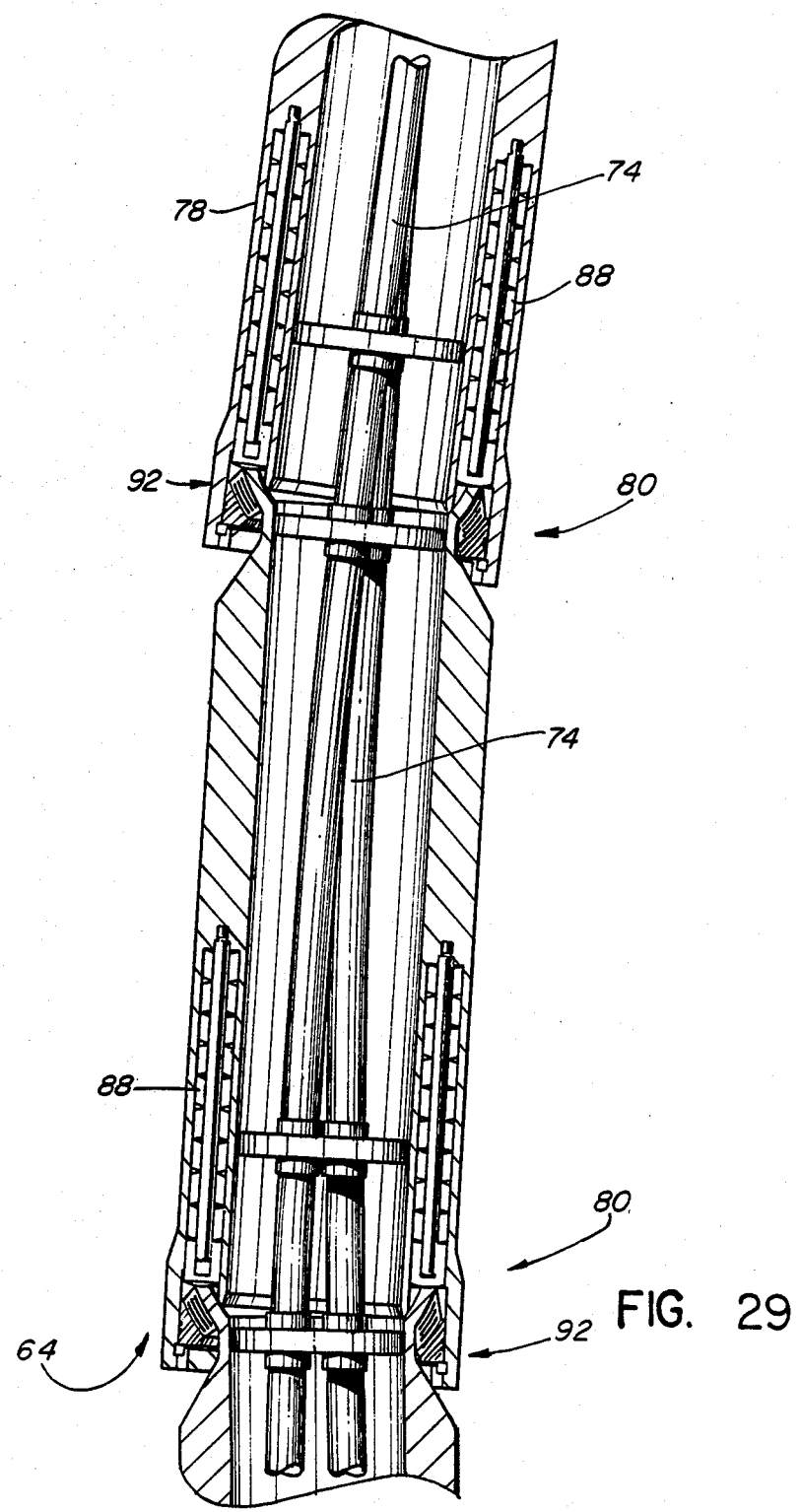

The outer casing arrangement 76 is shown in FIG. 24. In order to have it conform to an arc of a circle, which is the ideal required by the internal tubes 78, the flexjoints 80 must be capable of resisting some bending. Each flexjoint 80 must resist bending in proportion to its position in the overall assembly. This is similar to a stress joint, but the bending moments are considerably less. Many ways of stiffening a flexjoint 80 are possible but a system using springs is preferred. In FIG. 25a, the flexjoint 80 is provided with stress bars 82 to limit the movement of the casing 76. In FIG. 25b, the flexjoint 80 is provided with a chamber 84 enclosing springs 86 of suitable strength. FIG. 26 illustrates the chosen method of resisting bending. For normal loading, FIG. 26a, stiffness is supplied by the springs around the perimeter as in FIG. 25b. For the overload case FIG. 26b, i.e. where the flexjoint has reached its maximum travel, an extension 86 of the outer sleeve prevents further rotation. FIG. 27 shows the arrangement using Bellville springs, FIG. 28 shows the use of tie rods 90, and FIG. 29 shows the use of Bellville springs 88 and a Murdock flexjoint 92.

Figure 31:
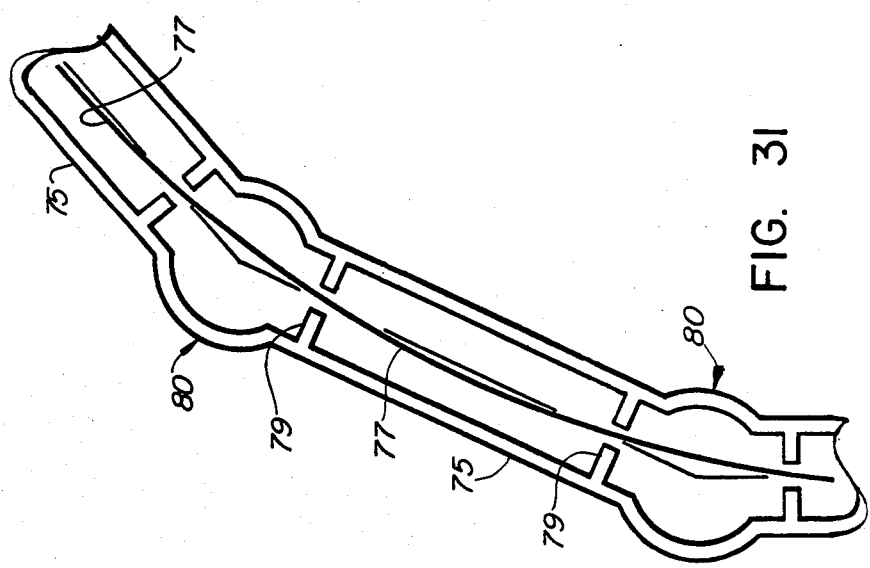

For the buckling problems it is proposed to use supports to reduce the critical buckling length. Howver, since the centreline 75 of the outer case 78 is kinked and the centreline 77 of the tubes 74 is an arc of a circle, this introduces a further problem. This is resolved when the length change problem is considered. FIGS. 30a–30c show that there is a particular configuration where no length change takes place. This is at some intermediate position between the tube centreline 77 being on the outside of the case centreline 75 and vice versa. The lengthwise positions, where the centrelines cross, is always the same no matter what the angle of flexure. In FIG. 30a the tubes 77 are longer than the casing 75; in FIG. 30b the lengths are the same; and in FIG. 30c the tubes 77 are shorter than the casing 75. Thus, it is at these nodal points that the interal tubing supports 79 are placed as shown in FIG. 31.

Figures 32A, 32B:
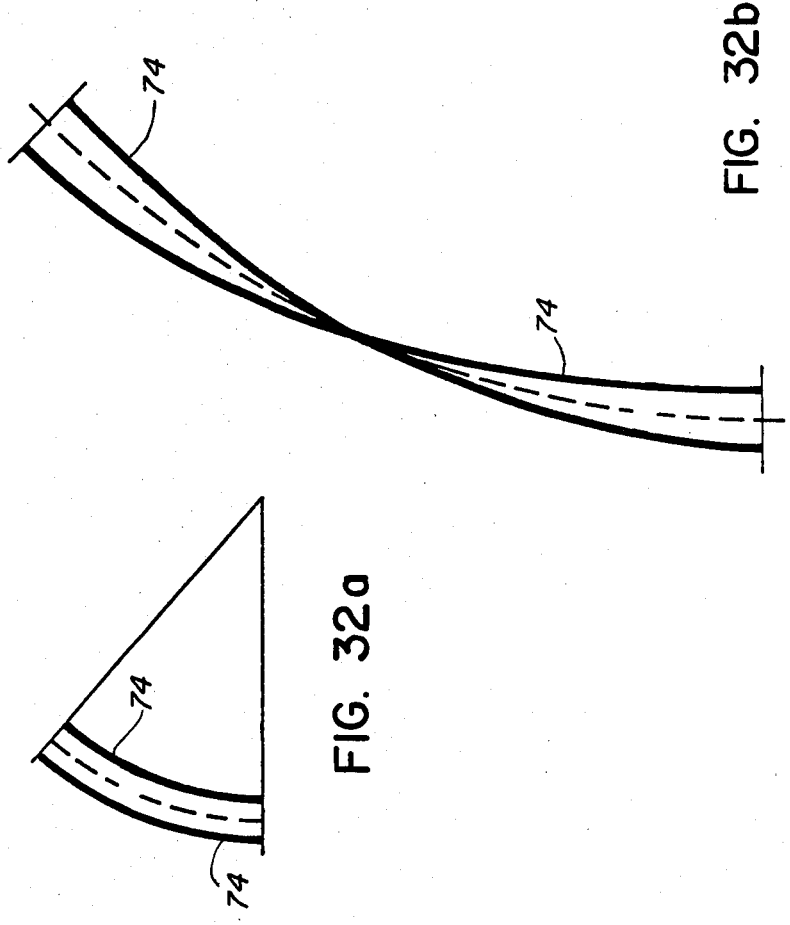

The off-centre bending problem where the tubes have a different arc length is resolved by introducing a 180 degree twist over the length of the assembly. In this way the arc length of each tube becomes identical as shown in FIGS. 32a and 32b. In FIG. 32a tubes 74 are parallel and have different lengths. In FIG. 32b the tubes 74 have the same lengths when bent if the assembly is twisted 180.

By using the features described above, all the stress problems are brought within realizable limits. The prime consideration from the stress viewpoint is to limit high tensile stresses because a unit of this type must have good fatigue characteristics. With the features described, most of the high stress areas are compressive stresses.

The angle of flex is only limited by how long the unit is and how many flexjoints are used in the outer case. The closeness of the flexjoints together is dependent on the critical buckling length of the internal tubes. When considering normal production tubing it has been found that each flexjoint need only flex between 3 and 6 degrees. For these angles, if seals are required, they can be a simple elastomer type (since it is not high pressure) and a regular ball joint is not required—the spring and stop arrangement illustrated in FIGS. 27 and 28 being sufficient.

The embodiments of the invention in which an exclusive property or privilege is claimed are defined as follows:

1. In the subsea production of hydrocarbons, a production riser for connecting a subsea structure to a floating facility for the passage of hydrocarbons from said subsea structure to said floating facility, comprising:
    (a) a plurality of linearly connected riser units having an upper end and a lower end;
    (b) each said riser unit including a central pipe and a plurality of peripheral pipes, each said pipe having a box end and a pin end;
    (c) upper and lower connecting frames located adjacent the upper and lower ends of each said riser unit, the lower connecting frame of one riser unit cooperating with the upper connecting frame of an adjacent riser unit to engage the central and peripheral pipes of said units;
    (d) a sleeve connector on one end of each pipe in each said riser unit for connecting the box ends of pipes of one unit to the pin ends of pipes of an adjacent unit;
    (e) each said connecting frame comprising a pair of plates concentrically mounted on one end of said central pipe and including a guideplate for locating the ends of said pipes of each riser unit in correct lateral location and a lockplate securing said pipes in correct vertical location;
    said guideplate and locking plate being rotatable with respect to one another;
    (f) apertures in said guide and locking plates for passage of said peripheral pipes therethrough; and
    (g) means providing detachable engagement between said locking plates and said peripheral pipes.

2. A production riser according to claim 1 including funnel means around the apertures for the peripheral pipes in said guideplate and wherein said detachable engagement means between said peripheral pipes and said locking plates comprises an annular groove in the sleeve connector of each of said peripheral pipes, said apertures in said locking plate being elongated and including a first portion of sufficient diameter to allow passage therethrough of said peripheral pipes and a second portion of smaller diameter which, when said locking plate is rotated with respect to said guide plate, engages the annular groove in said sleeve connector.

3. A production riser according to claim 1 wherein said sleeve connectors of one riser unit are located on the box ends of said pipes and which cooperate with said pin ends of an adjacent riser unit for connecting said units together.

4. A production riser according to claim 1 including a main subsea connector for securing said central and peripheral pipes to subsea equipment, said subsea connector including a cylindrical housing having a base secured to said subsea equipment and supporting the pin ends of the pipes thereof; a cover guide plate spaced from said base and including apertures therein for receiving said central and peripheral pipes; primary sleeve connectors for connecting the lower terminal ends of the peripheral pipes to the associated subsea pipes; and means detachably clamping the cover guide plate to said cylindrical housing.

5. A production riser according to claim 1 wherein the pin end of each peripheral pipe includes a latching flange; said peripheral pipe connectors each comprise a collet sleeve located on the box end of an associated peripheral pipe and incorporating a collar and a plurality of long collet fingers, depending from said collar, for engaging the latching flange of said pin end of a connected pipe; and a locking sleeve concentrically overlying and detachably secured to said collet sleeve; a pair of concentric shoulders on the inner wall of said locking sleeve and a pair of corresponding shoulders on each finger of the collet sleeve; the inner concentric shoulders of said locking sleeve engaging said collet finger shoulders when said locking sleeve is moved to an operative position so that inward pressure on said fingers against said latching flange is spread over a substantial area by engagement of said locking sleeve.

6. A production riser according to claim 5 wherein said pin end of said pipe has a second flange inwardly of, and of larger diameter than said latching flange; a flange member adjacent the box end of the connecting pipe; and inner seal means at either end of said locking sleeve, one seal engaging said box end flange member and the other seal engaging the second flange on said pin end, said locking sleeve completely enclosing said collet sleeve.

7. A production riser according to claim 1 in which said subsea structure includes a mandrel cone; and means for connecting the lower end of said production riser to said mandrel cone comprising:
    (a) a mandrel connector on the lower end of said riser;
    (b) a guide frame adjustably mounted to said mandrel connector on the lower end of said riser providing vertical and lateral movement of said guide frame relative to the longitudinal axis of said riser;
    (c) hydraulic ram means suspending said guide frame from said riser lower end and to effect said vertical and lateral movement;
    (d) said guide frame including a frusto-conical lower end for engaging said mandrel cone on said subsea structure; and
    (e) means for locking the guide frame to said mandrel cone.

8. In a production riser for connecting a subsea structure to a floating facility, and wherein said riser includes linearly connected pipe sections each having a box end and a pin end, a pipe connector for detachably connecting said pin end of one pipe to the box end of another pipe, and wherein the pin end of said pipe includes a latching flange; said pipe connector comprising a collet sleeve for location on the box end of a pipe; said connector including a collar and a plurality of long collet fingers depending therefrom for engaging the latching flange of said pin end of said pipe; and a locking sleeve concentrically overlying and detachably secured to said collect sleeve; a pair of concentric shoulders on the inner wall of said locking sleeve and a pair of corresponding stepped shoulders on each finger of the collet sleeve; the inner concentric shoulders of said locking sleeve engaging said collet finger shoulders when said locking sleeve is moved to an operative position so that inward pressure on said fingers against said latching flange is spread over a substantial area by engagement of said locking sleeve thereby reducing bending of said collet fingers.

9. A connector according to claim 8 wherein said pin end of said pipe has a second flange inwardly of, and of larger diameter than said latching flange, a flange member adjacent the box end of the connecting pipe; and inner seal means at either end of said locking sleeve, one seal engaging said box end flange member and the other seal engaging the second flange on said pin end, said locking sleeve completely enclosing said collet sleeve.

10. In a production riser for connecting a subsea structure to a floating facility, means for connecting the lower end of said riser to a mandrel cone on said subsea structure comprising:
   (a) a mandrel connector mounted on the lower end of said riser;
   (b) a guide frame adjustably mounted to said mandrel connector on the lower end of said riser providing vertical and lateral movement of said guide frame relative to the longitudinal axis of said riser;
   (c) hydraulic ram means suspending said guide frame from said riser end to effect said vertical and lateral movement;
   (d) said guide frame including a frusto-conical lower end for engaging said mandrel cone of said subsea structure; and
   (e) means for locking the guide frame to said mandrel cone.

* * * * *